United States Patent [19]

Miller

[11] 4,142,296
[45] Mar. 6, 1979

[54] TOOL CALIBRATION SYSTEM FOR MICROMACHINING SYSTEM

[75] Inventor: Donald M. Miller, Sunnyside, Wash.

[73] Assignee: The United States of America as represented by the United States Department of Energy, Washington, D.C.

[21] Appl. No.: 860,653

[22] Filed: Dec. 14, 1977

Related U.S. Application Data

[62] Division of Ser. No. 750,317, Dec. 14, 1976, Pat. No. 4,083,272.

[51] Int. Cl.² .............................................. G01B 5/00
[52] U.S. Cl. ............................... 33/181 R; 33/174 L; 33/185 R
[58] Field of Search ........... 33/174 L, 174 PC, 181 R, 33/185 R

[56] References Cited

U.S. PATENT DOCUMENTS

| 3,670,421 | 6/1972 | Kiewicz et al. ............... 33/174 L |
| 4,083,272 | 4/1978 | Miller ............................. 33/185 R |

FOREIGN PATENT DOCUMENTS

| 883660 | 7/1953 | Fed. Rep. of Germany ........ 33/174 L |
| 1423752 | 10/1969 | Fed. Rep. of Germany ........ 33/174 L |
| 50335 | 9/1966 | German Democratic Rep. ... 33/174 L |

Primary Examiner—Richard R. Stearns
Attorney, Agent, or Firm—Dean E. Carlson; Frank H. Jackson; Jerold B. Schnayer

[57] ABSTRACT

A tool calibration system including a tool calibration fixture and a tool height and offset calibration insert for calibrating the position of a tool bit in a micromachining tool system. The tool calibration fixture comprises a yokelike structure having a triangular head, a cavity in the triangular head, and a port which communicates a side of the triangular head with the cavity. Yoke arms integral with the triangular head extend along each side of a tool bar and a tool head of the micromachining tool system. The yoke arms are secured to the tool bar to place the cavity around a tool bit which may be mounted to the end of the tool head. Three linear variable differential transformer's (LVDT) are adjustably mounted in the triangular head along an X axis, a Y axis, and a Z axis. The calibration insert comprises a main base which can be mounted in the tool head of the micromachining tool system in place of a tool holder and a reference projection extending from a front surface of the main base. Reference surfaces of the calibration insert and a reference surface on a tool bar standard length are used to set the three LVDT's of the calibration fixture to the tool reference position. These positions are transferred permanently to a mastering station. The tool calibration fixture is then used to transfer the tool reference position of the mastering station to the tool bit.

2 Claims, 39 Drawing Figures

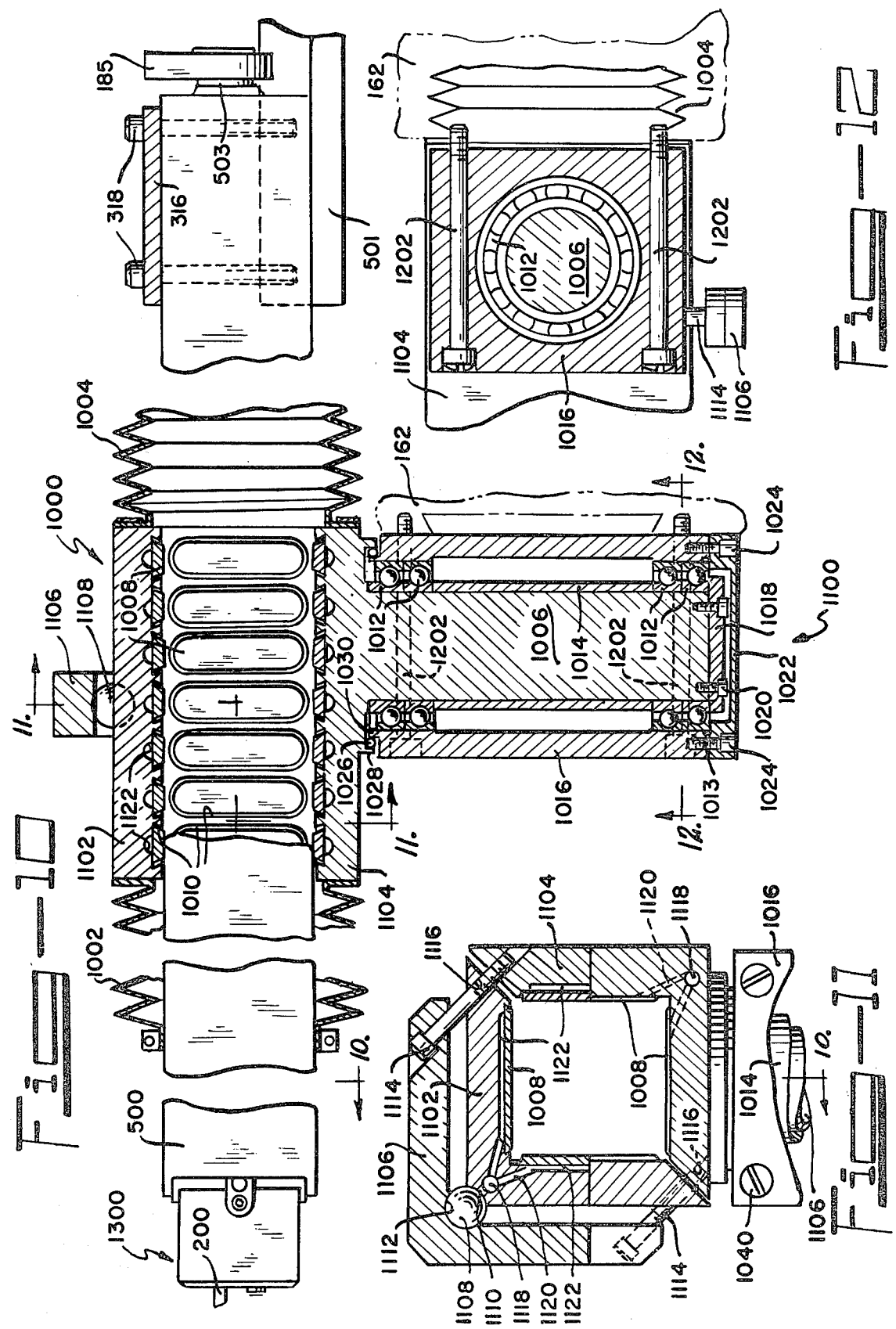

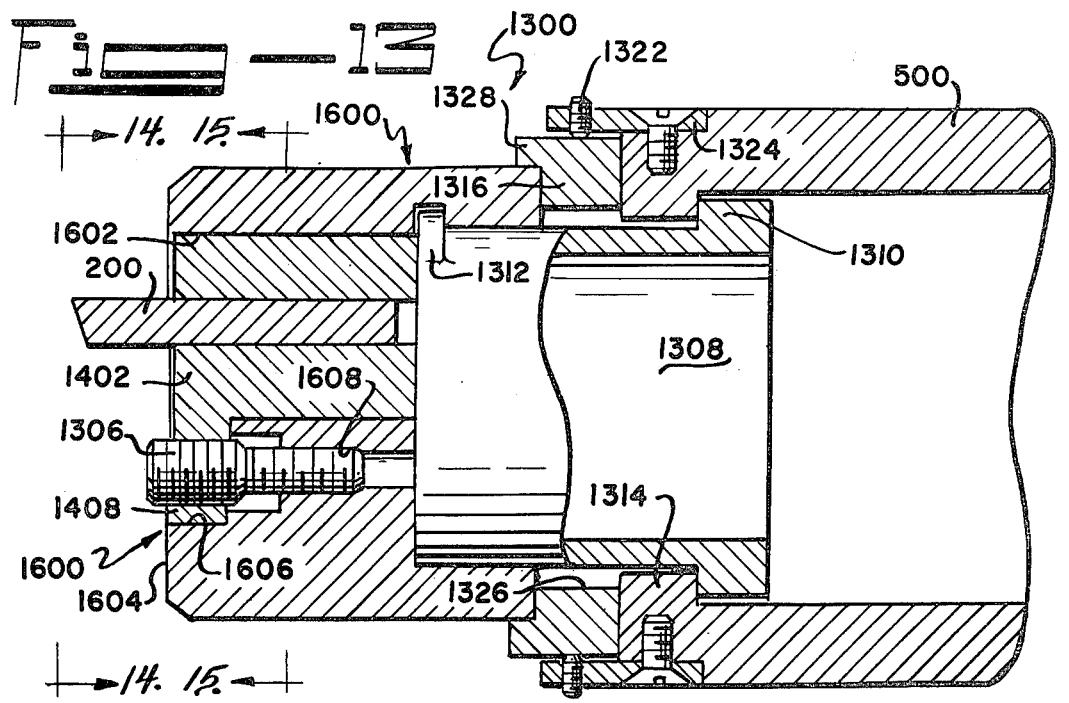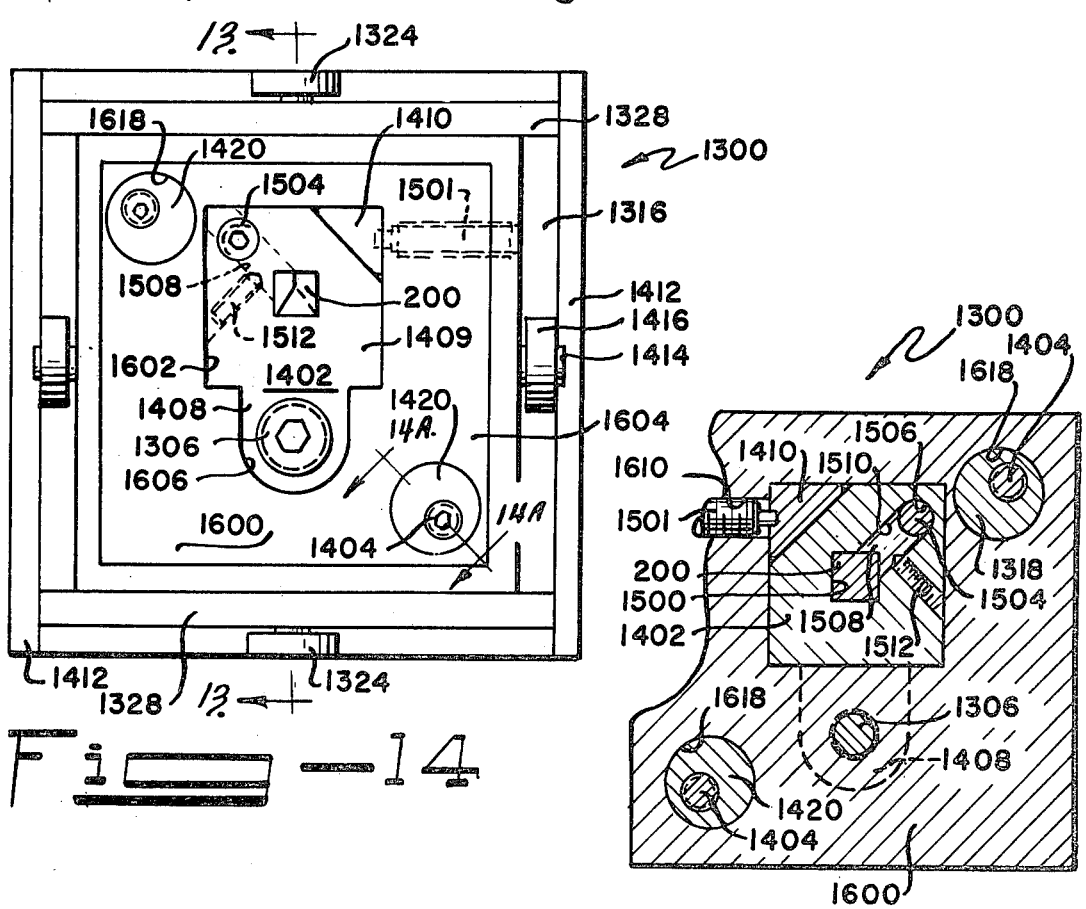

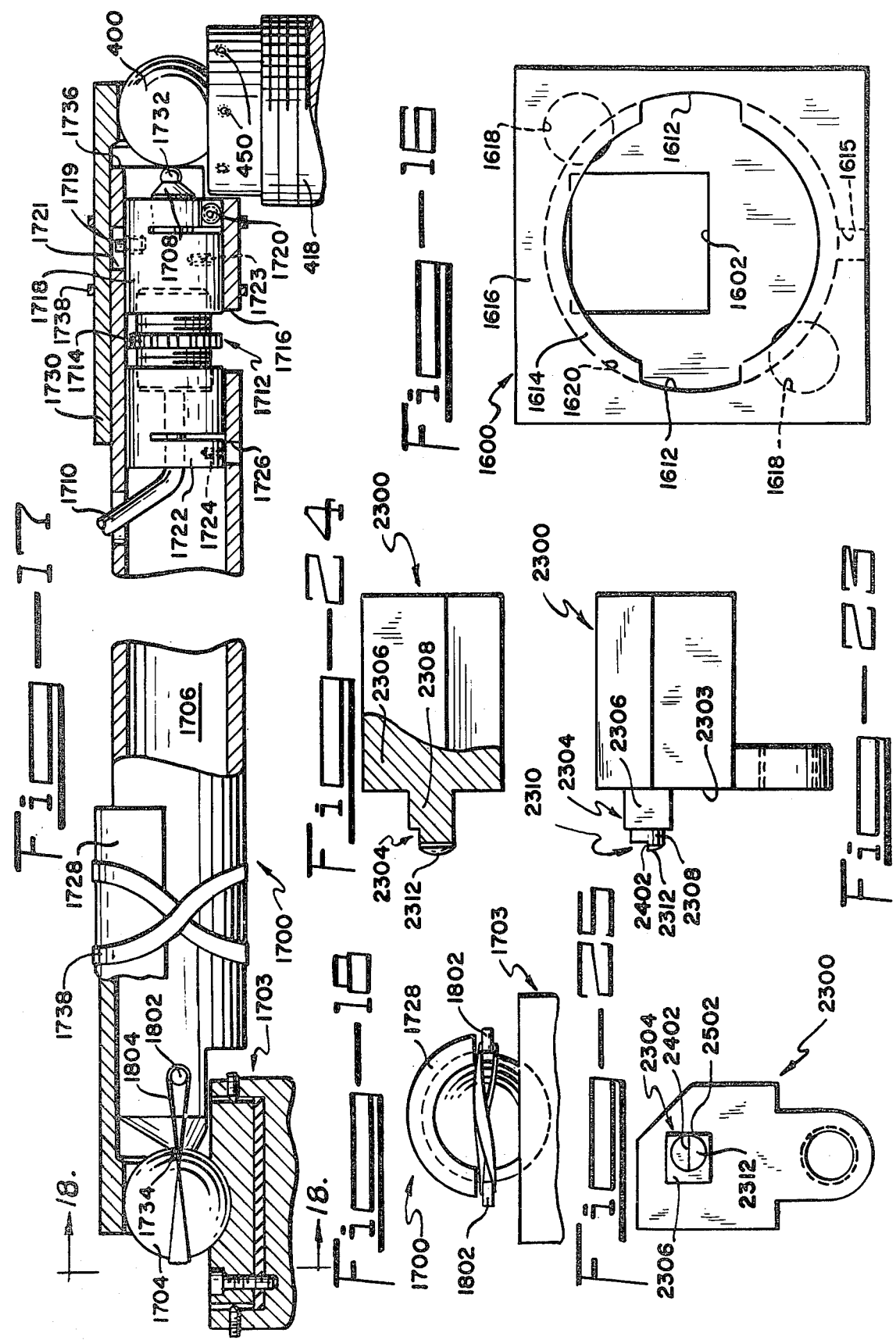

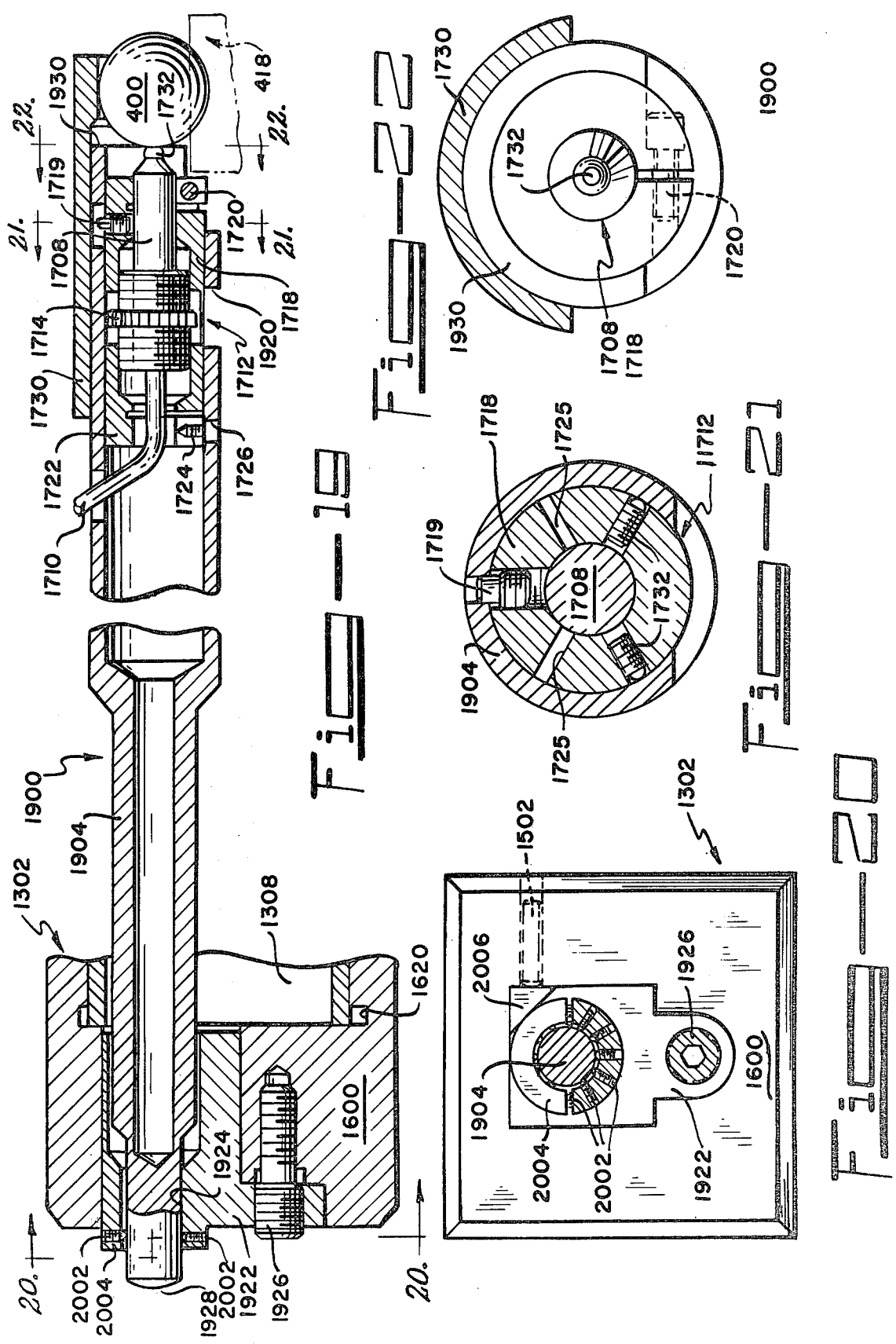

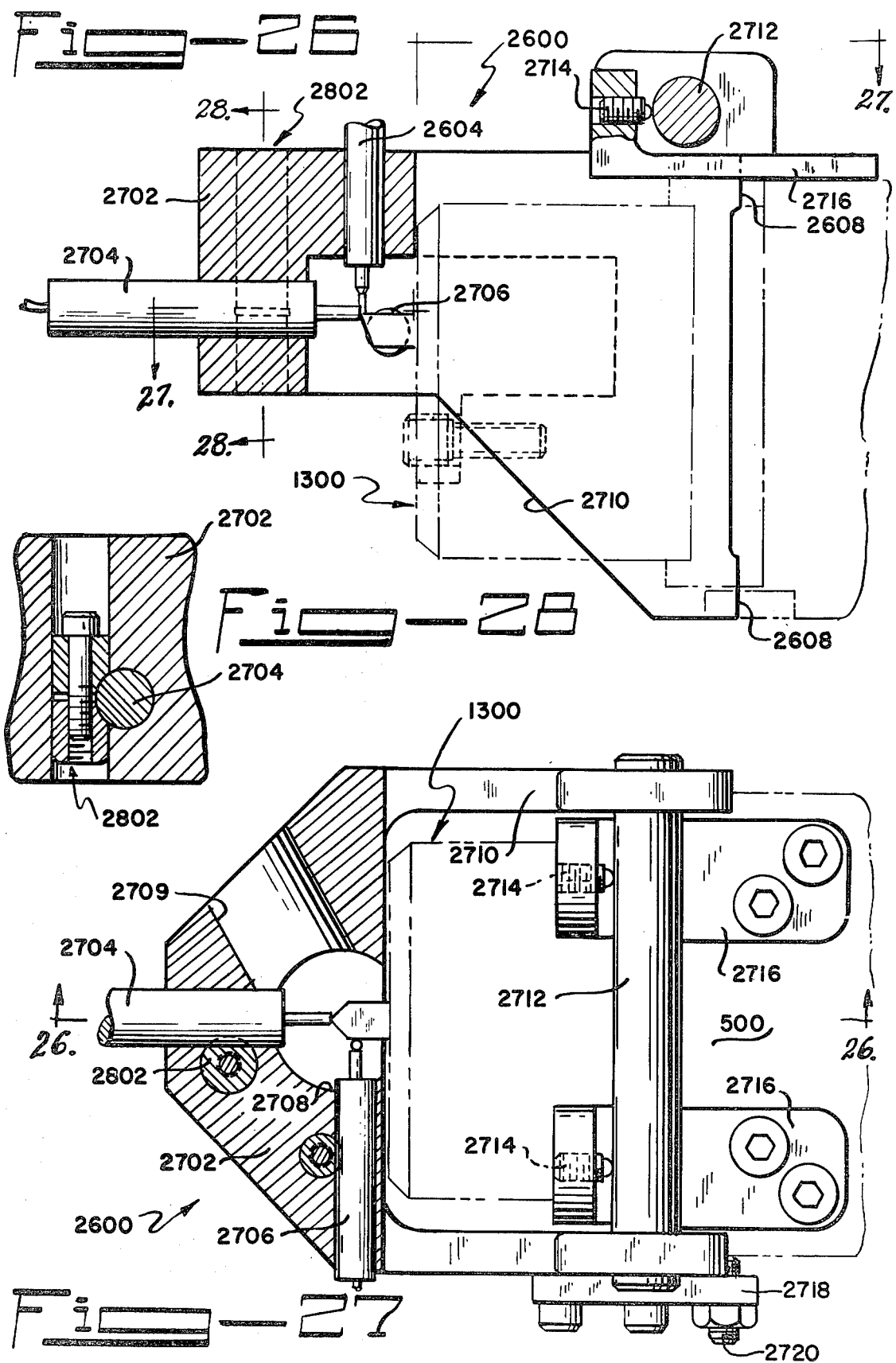

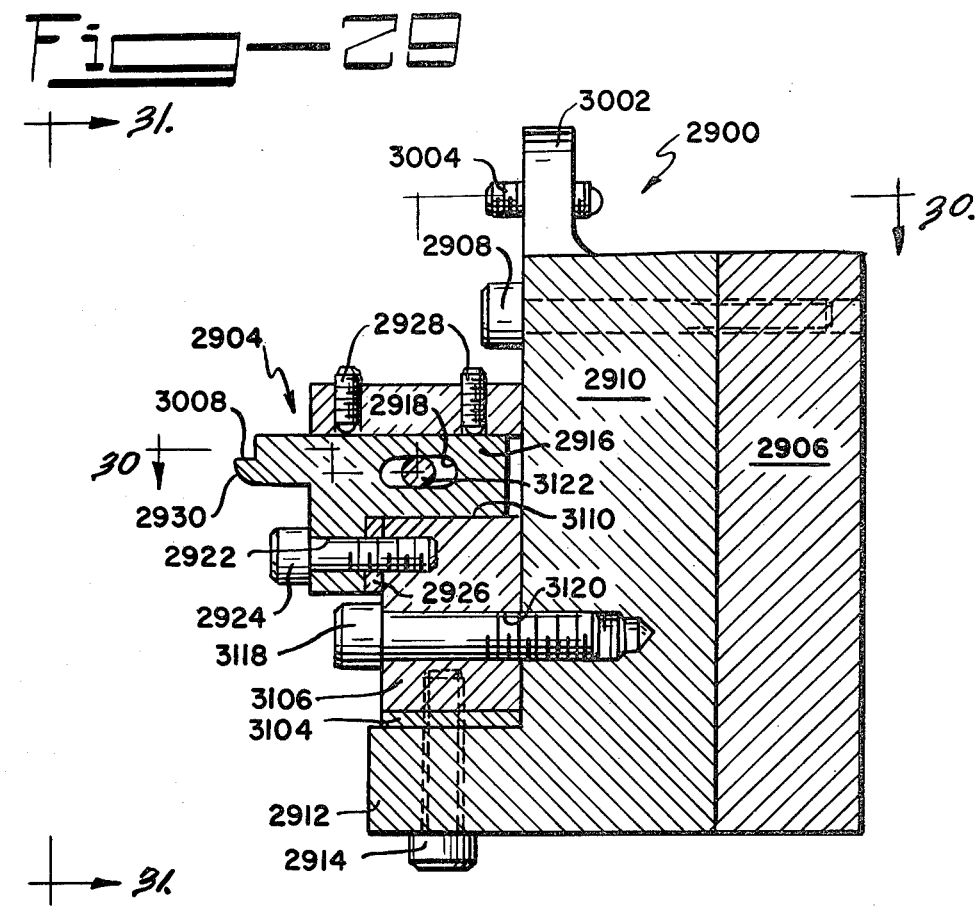

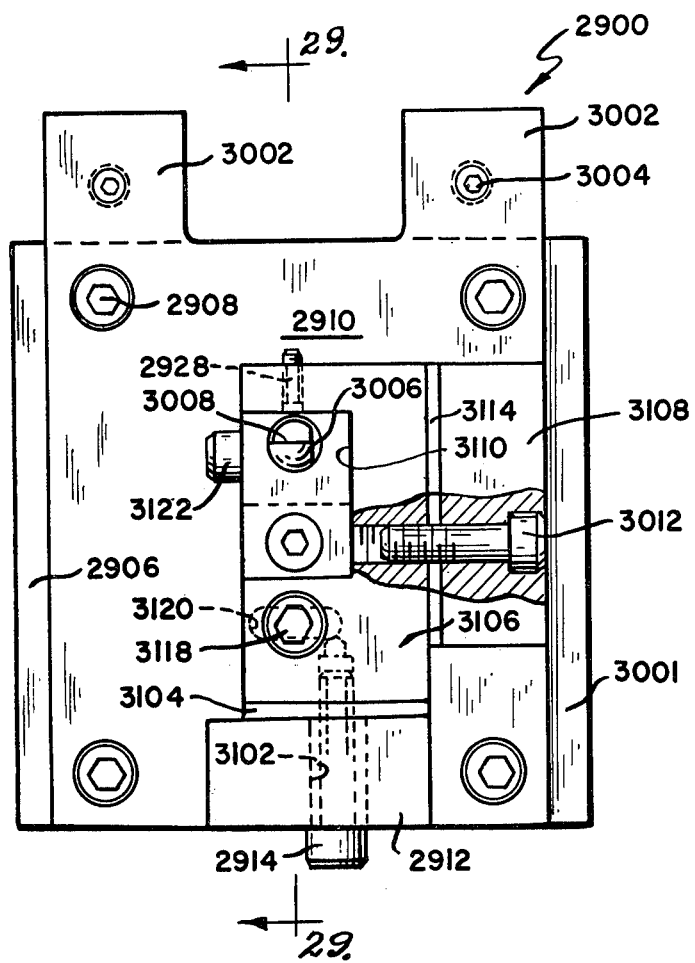

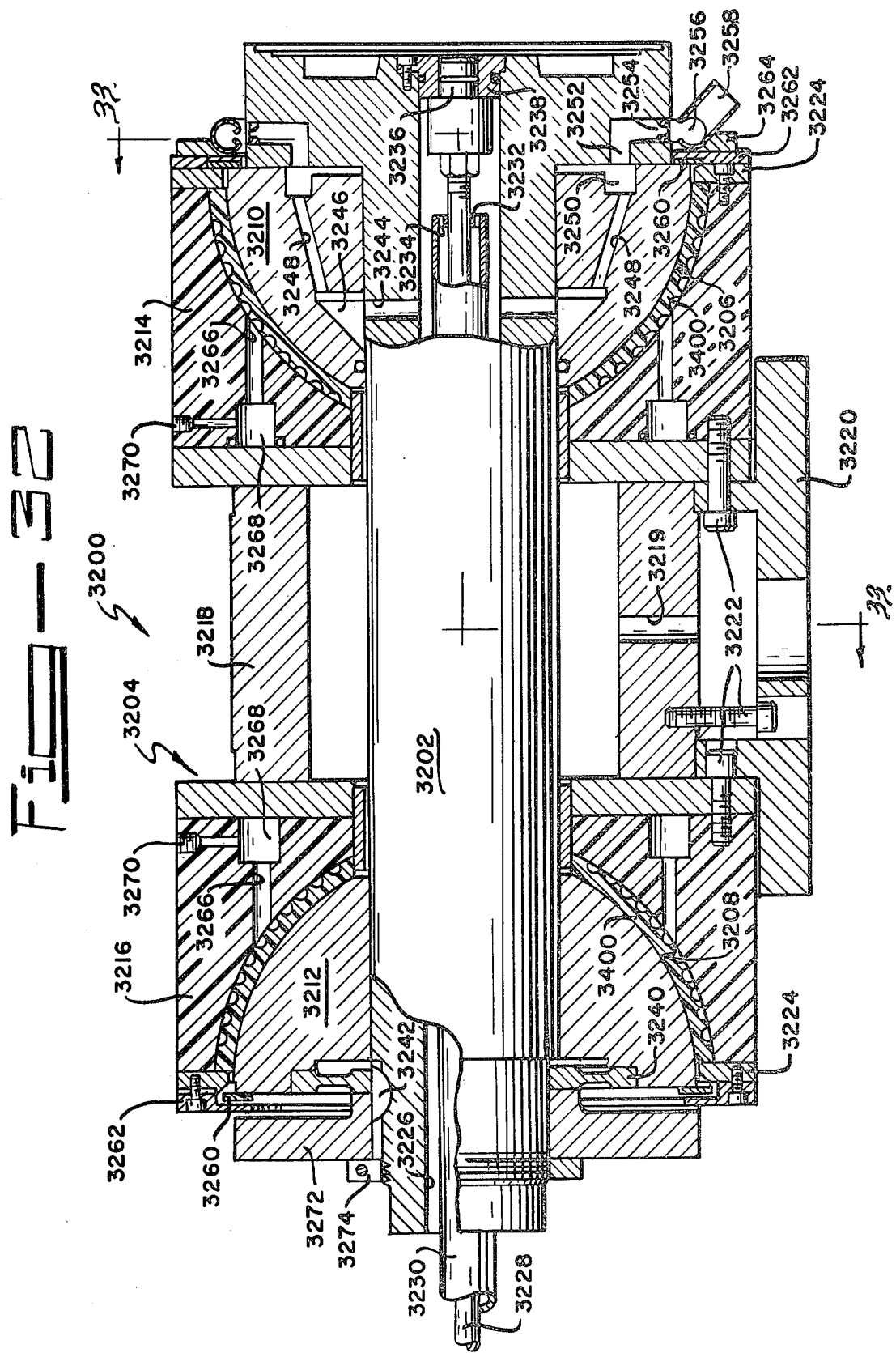

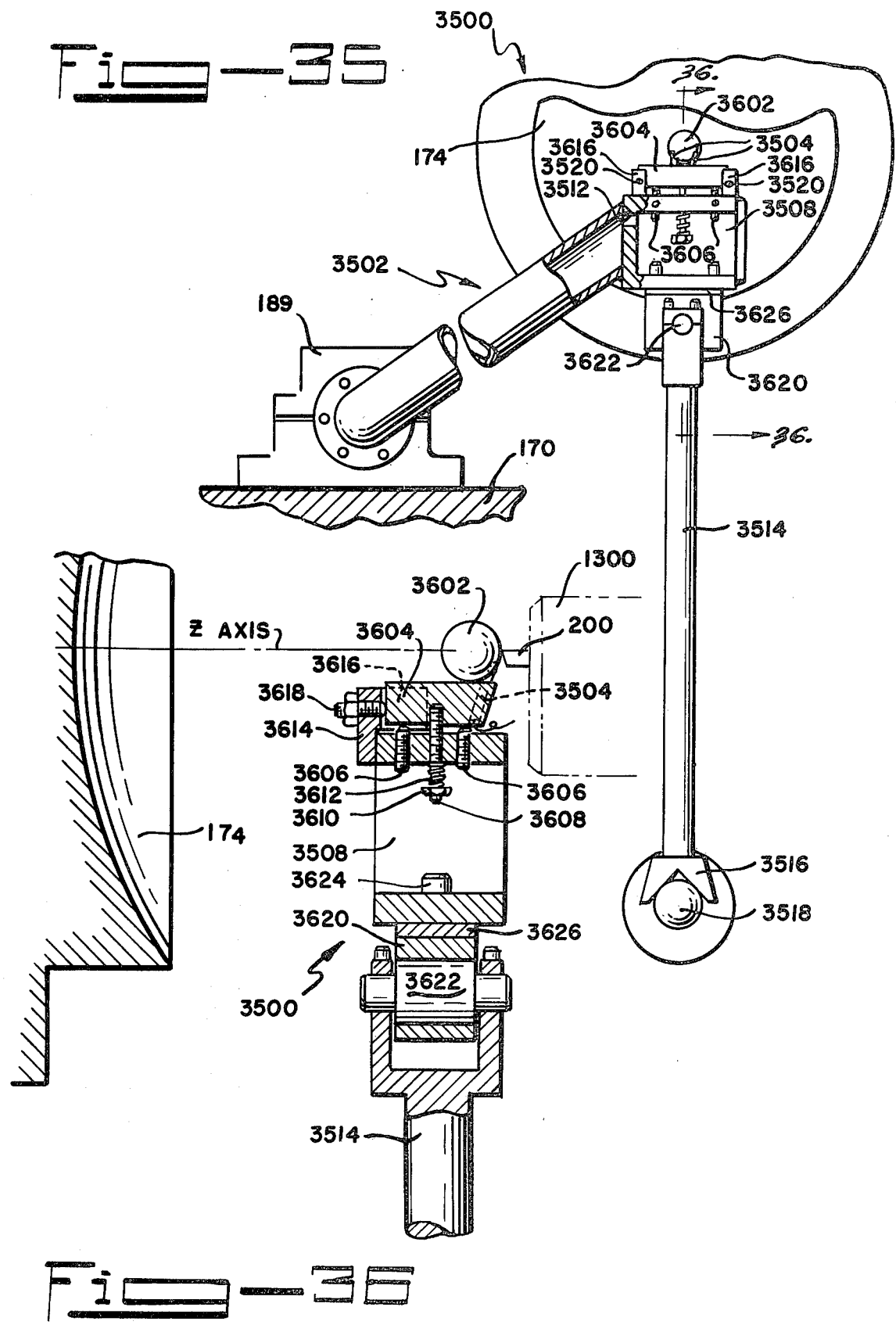

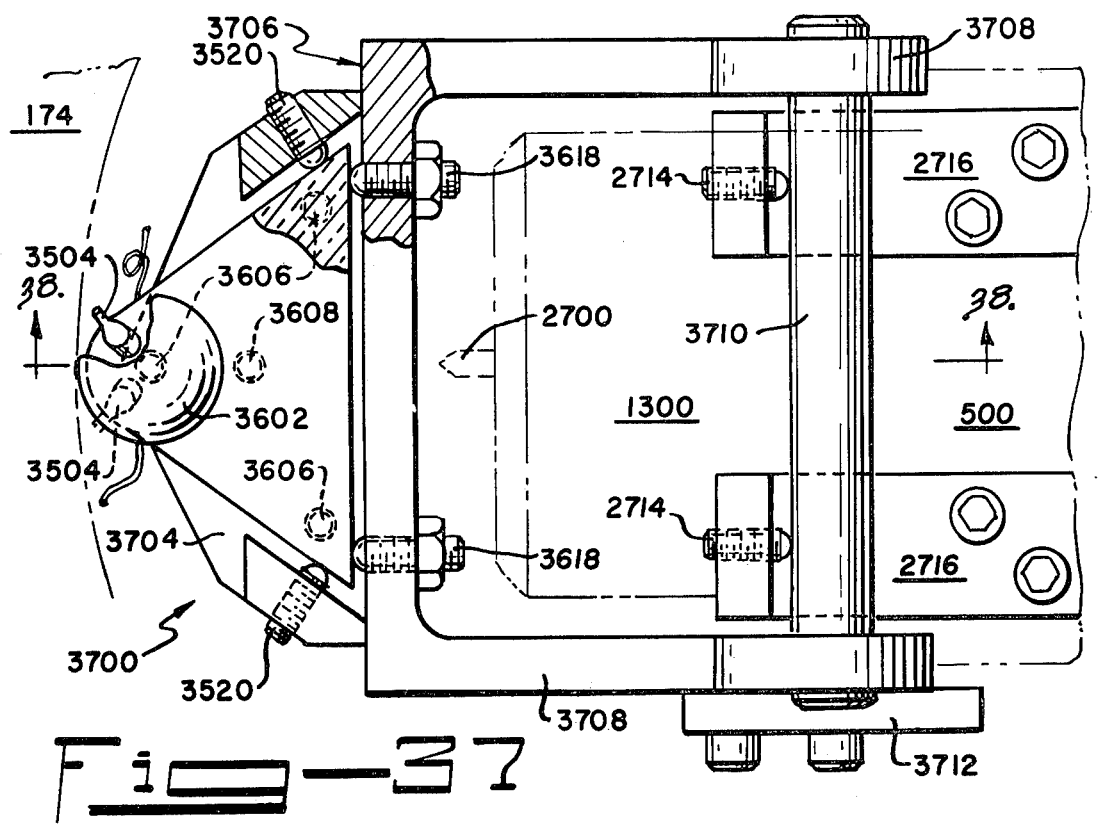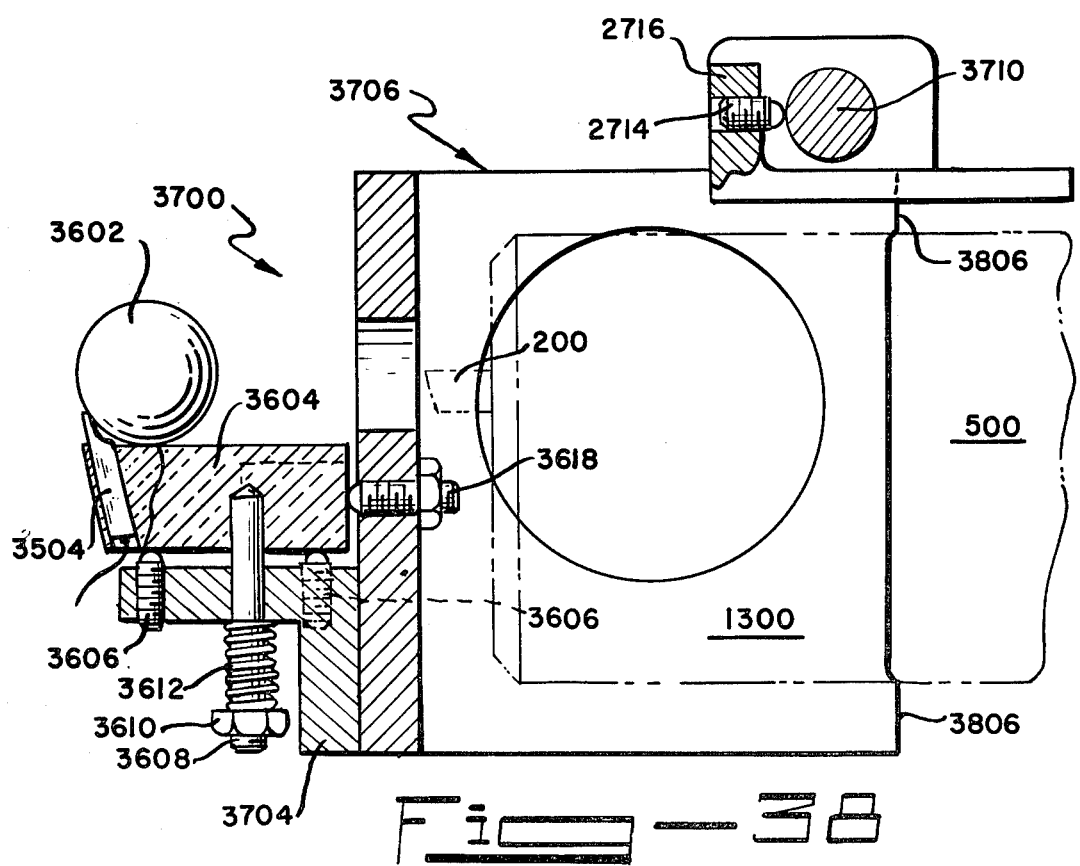

TOOL CALIBRATION SYSTEM FOR MICROMACHINING SYSTEM

CONTRACTUAL ORIGIN OF THE INVENTION

The invention described herein was made in the course of, or under, a contract with the UNITED STATES ENERGY RESEARCH AND DEVELOPMENT ADMINISTRATION.

CROSS-REFERENCE TO RELATED APPLICATIONS

This is a division of applicant's prior co-pending application Ser. No. 750,317 and now U.S. Pat. No. 4,083,272, filed Dec. 14, 1976.

BACKGROUND OF THE INVENTION

This invention relates to a tool calibration system including a tool calibration fixture and a tool height and offset calibration insert for calibrating the position of a tool bit in a micromachining tool system. The tool calibration system was designed for use with the micromachining tool system disclosed and claimed in Omega-X Micromachining System, U.S. Application Ser. No. 750,317 and now U.S. Pat. No. 4,083,272 by Donald Miller, filed Dec. 14, 1976. This micromachining tool system is used to produce optical quality surface finishes on large sperical, asperical, flat, and irregular surfaces.

Conventional fine machining systems often resemble "T" bed turning and boring machines. Such machines often have stacked slides and may have a machine spindle mounted on one slide and a cutting tool on another slide, making a 90 degree angle with the first slide. The slides are usually quite massive and require ball-screw mechanisms for accurate movement. It is also common practice to employ caged roller mechanisms between sliding members and way surfaces to reduce friction; these devices create mechanical noise which is reflected in the surface of the workpiece. These disadvantages are avoided by the omega-X micro-machining tool system.

Several additional problems arise when a surface must be finished to an optical quality, i.e., 3 nanometers RMS ($3 \times 10^{-9}$ meter). First, the cutting tool is moved directly toward or away from the workpiece; because of the orthogonal axes and relatively large pulse increments from the pulsed motor system commanding movement of the carriage, the movements toward or away from the workpiece are large compared to the accuracy desired. Second, the inertia of the moving carriage is large; it tends to cause overtravel because the inertia is difficult to overcome before the carriage has exceeded the commanded distance. Third, the ball-screw mechanism used to move the carriage is not "stiff" enough to control the carriage movement; the mechanism is subject to backlash and dimensional changes due to stress imposed by loads. Fourth, unwanted motion can be transmitted to the workpiece from the driver through the spindle which further disturbs the desired spatial relationship of the tool to the workpiece. These errors are, of course, in addition to errors in the shape and dimensions of the tool bit employed, and errors incurred in establishing a precisely known position of the tool bit nose in relation to the workpiece.

SUMMARY OF THE INVENTION

The invention is directed to a tool calibration system including a tool calibration fixture and a tool height and offset calibration insert for calibrating the position of a tool bit in a micromachining tool system.

The tool calibration fixture comprises a yokelike structure having a triangular head, a cavity in the triangular head, and a port which communicates a side off the triangular head with the cavity. Yoke arms integral with the triangular head extend along each side of a tool bar and a tool head of the micromachining tool system. A support rod which is fixed to the yoke arms is engaged by a plurality of spring plungers mounted in a plurality of clips fixed to the top of the tool bar to place the cavity around a tool bit which may be mounted to the end of the tool head. A X axis linear variable differential transformer, a Y axis linear variable transformer, and a Z axis linear variable differential transformer are adjustably mounted in the triangular head along an X axis, Y axis, and Z axis. The Z axis is coaxial to the axis of the tool bar. Means are provided for positioning the yokelike structure along the X axis and the Z axis. Means are also provided for retaining the positions of the X axis linear variable differential transformer, the Y axis linear variable differential transformer, and the Z axis linear variable differential transformer.

The calibration insert is used along with a tool bar standard length to set the tool calibration fixture to a tool reference position. The calibration insert comprises a main base which has the same general shape as a tool holder of the micromachining tool system and which adjustably mounts in an opening in the tool head identical to the tool holder. A reference projection having a parallelpipedal base extends from a front face of the main base. The parallelpipedal base has an offset reference surface on one side. The reference projection also has a locating cylinder which extends from the parallelpipedal base for sweeping the calibration insert into alignment with the Z axis. The locating cyclinder terminates in a step which serves as a height reference surface. These reference surfaces are used to set the X axis linear variable differential transformer and the Y axis linear variable differential transformers to the tool reference position. The tool bar standard length is used to set the Z axis linear variable differential transformer to the tool reference position. These positions can be transferred permanently to a mastering station so that the calibration insert and the tool bar standard length need not be used for each tool bit change once initial calibration is complete. The calibration fixture is then used to transfer the tool reference position of the mastering station to the tool bit.

It is an object of the invention to produce spherical, aspherical, and irregular surfaces up to 1 meter in diameter with contour errors no greater than 100 mm and surface finishes less than 0.8 RNS.

It is another object of the invention to provide a tool calibration system for calibrating the position of a tool bit in a micromachining tool system.

Since the gage was designed for use with a micromachining tool system a detailed description of the system is included herein.

DESCRIPTION OF THE OPERATION OF THE MICROMACHINING TOOL SYSTEM

The micromachining tool system employs a new axis of motion, new machine calibration instruments and a thermally stabilized spindle for mounting and rotating a workpiece. The micromachining tool includes means for rotating a workpiece, a tool bar carrying a tool bit at one end for cutting the workpiece, a first slide for moving the tool bar in a direction perpendicular to the plane of the workpiece, and a second slide mounted on the first slide aligned in a direction parallel to the plane of the workpiece. The second slide includes means for swinging the tool bar about an axis located near its end remote from the tool bit and perpendicular to the axes of the first and second slides, and means for moving this perpendicular axis along an arc surrounding the perpendicular axis at the same time the tool bar is swinging on said perpendicular axis.

Concerning the axes of motion, the micromachining tool is capable of movement in conventional X and Z axes, the X axis being defined as usually horizontal and at a right angle to the Z axis which is perpendicular to the plane of the workpiece and coaxial with the spindle on which the workpiece is mounted. For normal machining operations, however, the Z axis movement is not employed. Because of the lesser importance of movement along a Z-axis slideway, the Z axis has been located on the spindle centerline to facilitate the description of the micromachining tool, rather than parallel to it, as would be dictated by generally accepted nomenclature for machine tools. Instead, one end of a tool bar is pivotally linked to eccentric adjustment guides on an eccentric mechanism; rotation of the eccentric moves the tool bar pivot through an arc of as much as 180 degrees on a radius (centered on the Y axis which passes through the center of the eccentric mechanism at a right angle to the X-Z plane) whose length is determined by the amount of offset between upper and lower eccentric adjustment guides. Therefore, for a given rotation of the eccentric mechanism, motion of the tool bar along the Z axis may be varied depending upon where the pivot is located on the arc of the described circle. This angular movement of the tool bar pivot point is measured by an angle omega formed by the Z axis and the radius on which the pivot point lies. It is the first of two machining motions. At the same time, the other end of the tool bar which mounts the tool bit slides in a linear air bearing pivotally attached to a pivot bearing mounted on a cross slide and travelling along the X axis; this is the second of two machining motions. Note that errors in movement along the X axis due to inaccuracies in the lead screw mechanism driving the X axis will have a minimum effect on the accuracy of the machined contour since the X axis lies in a plane parallel to the plane of the workpiece and at a right angle to the Z axis. Furthermore, the linear air bearing has an averaging effect on the tool bar since the air bearing is long in relation to the errors in the machined surfaces of the tool bar itself; this averaging effect reduces erroneous movements of the tool bar in X, Y and Z directions. Furthermore, errors in the X axis lead screw mechanism which would cause erroneous movement of the tool bit along the Z axis cannot be transmitted to the tool bit because of the free movement of the tool bar with respect to the linear air bearing; consequently, the only errors in the X axis that can cause errors in the workpiece contour are lead errors in the actuating screw itself which cause errors in the X direction. For this reason, the X axis servodrive and lead screw mechanism are very accurately calibrated by a laser interferometer. Motion in the omega and X axes may be combined in order to move the cutting tool along a desired contour, maintaining very high accuracy and avoiding serious problems inherent in the prior art. The micromachining tool system is controlled by a dedicated computer which has previously been supplied with the precise position of the tool bit nose, the shape of the tool bit nose and the desired contour to be produced on the workpiece. Necessary tool bit motions in the omega and X axes are calculated by a mathematical program which relates omega and X coordinates to coordinates describing the position of a point on the surface of the workpiece and supplied to the dedicated computer.

Because desired accuracy is less than 100 nm contour error and 0.8 nm RMS surface finish and because the incremental movement of the tool in the Z axis may be varied between 0 to 4.4 nm, it is necessary to use new machine tool calibration techniques in order to accurately determine the position of the tool nose. By way of comparison of various surface finishing techniques, the following table is presented:

| Method | Finish Accuracy (nm, RMS) |
| --- | --- |
| Fine machining | 800 |
| Fine grinding | 100 |
| Lapping | 12-25 |
| Omega-X micromachining | 0.8 |

First, with regard to initial calibration, the spindle is aligned coaxially with the Z axis. Next, the tool bar is aligned parallel to the Z axis. Then, the pivot bearing position on the X axis is calibrated by a laser interferometer; each step of the lead screw mechanism as indicated by master and secondary encoders in the X-axis servodrive is measured by the interferometer and relayed to the dedicated computer. Then, the distance between the Y axis of the eccentric mechanism represented by the center of an eccentric reference ball located on the Y and Z axes and the parallel pivot axis of the pivot bearing mounted on the X slide must be determined. To accomplish this, the eccentric reference ball and a pivot reference ball are located on the X and Z axes horizontally and vertically on the Y axis and pivot axis, respectively. The distance between the centers of the two balls is then determined by a pivot axis calibrating device which is a length standard with a linear variable differential transformer (LVDT) mounted at one end. The computer may then be instructed with this distance so that movement of the X-axis slide may be related to movement of the tool itself. The eccentric reference ball and pivot reference ball are located in X and Y directions by sweeping in the surface of each reference ball by an indicator mounted on an extension bracket attached to the spindle. The position of each ball on the Z axis may be established by use of a laser interferometer. The accuracy of location of each ball is +250 nm. The position of the eccentric mechanism through the full range of the omega axis is angularly calibrated by laser interferometer and stored in the computer.

Next, a tool bar length standard which consists of a bar of known length with a LVDT mounted at one end is inserted through the tool bar which, for this reason, is hollow. The purpose of the length standard is to establish a reference point in space, 1 meter from the center of the eccentric reference ball, which is on the Z axis. The tool bar in this position is also aligned concentrically with the Z axis. The point in space is then transferred to a tool calibration fixture temporarily installed on the end of the tool bar which contains tool height, tool offset, and tool bar length LVDT's. The position of the reference point in X and Y directions is determined from a tool height and offset calibration insert. The tool calibration fixture and the calibration insert make up the tool calibration system which is the subject matter of this application. To preserve the measurement, the calibration fixture and its LVDT's are used to transfer their readings to a calibration fixture mastering station possessing an anvil which represents the tool bit. Initial calibration accuracy is +25 nm. Once this is accomplished, the mastering station is used as a reference for setup calibration until such time as the entire calibration must be repeated.

Eccentric offset is measured by a laser interferometer.

Once the tool bit has been installed and located at the reference point by the calibration fixture, its nose contour is gaged by a tool gage which is composed of a glass plate containing two electrical contacts and supporting a steel ball resting against the contacts. As the tool bit is moved against the steel ball, the very slight contact pressure causes an extremely small movement of the steel ball which breaks the electrical circuit between the two electrical contacts. The contour information is supplied to the dedicated computer controlling the micromachining tool so that the computer knows not only the position of the tool bit to an accuracy of +25 nm but also the contour of the tool bit nose to an accuracy of +25 nm.

The micromachining tool system employs an air-bearing thermally-stabilized spindle to rotate the workpiece. The spindle is driven through a torque-smoothing pulley and vibrationless rotary coupling which minimize transmission of undesired motion to the spindle and workpiece from the motor rotating the spindle. The spindle has a gravity-fed oil cooling system to temperature-stabilize the air-bearing spindle and prevent changes in location of the workpiece due to thermal growth caused by heating of the spindle.

The entire micromachining tool system, except for its driving motor, is air-mounted, oil-bathed, and contained within a sound-dampened enclosure and room.

A workpiece gage similar to the tool gage may be mounted on the end of the tool bar to gage the contour of the workpiece in a fashion similar to that by which the tool bit nose contour itself is gaged. Gaging the workpiece while still on the machine avoids the possibility that deformation after removal could be construed as machine caused error.

BRIEF DESCRIPTION OF THE DRAWINGS

FIG. 8 is a detail sectional view of a pivot link between the rotary table and plate on the lower eccentric adjustment guide along line 8—8 of FIG. 7.

FIG. 9 is a detail view in a Y-Z plane of a shimming clamp on a tool bar end bearing plate along line 9—9 of FIG. 5.

FIG. 10 is a sectional view in a Y-Z plane of a tool bar, linear air bearing and pivot bearing along line 10—10 of FIG. 11.

FIG. 11 is a sectional view in an X-Y plane of the linear air bearing along line 11—11 of FIG. 10, with the tool bar removed.

FIG. 12 is a sectional view in an X-Z plane of the pivot bearing along line 12—12 of FIG. 10.

FIG. 13 is a sectional view in a Y-Z plane of a tool head and tool bar along line 13—13 of FIG. 14.

FIG. 14 is a view in an X-Y plane of the tool head and tool bar along line 14—14 of FIG. 13.

FIG. 14A is a detail sectional view of a friction lock in the tool head along line 14A—14A in FIG. 14.

FIG. 15 is a sectional view in an X-Y plane of the tool head along line 15—15 of FIG. 13.

FIG. 16 is a sectional view of the opposite face of a head piece which is part of the tool head and tool bar shown in FIG. 14, with all associated parts removed.

FIG. 17 is a view in a Y-Z plane, partially in section, of a pivot axis calibrating device mounted on an eccentric reference ball and a pivot reference ball.

FIG. 18 is a view in an X-Y plane of the pivot axis calibrating device along line 18—18 of FIG. 17.

FIG. 19 is a sectional view in a Y-Z plane of a tool bar length standard mounted in the tool bar and on the eccentric reference ball.

FIG. 20 is a view in an X-Y plane, partially in section, of the tool bar length standard and tool head along line 20—20 of FIG. 19.

FIG. 21 is a sectional view in an X-Y plane of the tool bar length standard along line 21—21 of FIG. 19.

FIG. 22 is a view in an X-Y plane of the tool bar length standard along line 22—22 of FIG. 19.

FIG. 23 is a view in a Y-Z plane of a tool calibration and offset insert.

FIG. 24 is a view in an X-Y plane, partially broken away, of the tool calibration and offset insert.

FIG. 25 is a view in an X-Y plane of the tool calibration and offset insert.

FIG. 26 is a view, partially in section, in a Y-Z plane of a tool calibration fixture mounted on the tool head over a tool bit, along line 26—26 of FIG. 27.

FIG. 27 is a view, partially in section, in an X-Z plane of the tool calibration fixture mounted on the tool head, along line 27—27 of FIG. 26.

FIG. 28 is a detail sectional view in an X-Y plane of an LVDT clamp along line 28—28 of FIG. 26.

FIG. 29 is a sectional view in a Y-Z plane of a mastering station along line 29—29 of FIG. 31.

FIG. 30 is a view in an X-Z plane, partially in section, of the mastering station along line 30—30 of FIG. 29.

FIG. 31 is a view in an X-Y plane of the mastering station along line 31—31 of FIG. 29.

FIG. 32 is a sectional view in a Y-Z plane of a main air bearing spindle.

FIG. 35 is a view, partially in section, in an X-Y plane of a tool gage and gage arm.

FIG. 36 is a sectional view in a Y-Z plane of the tool gage along line 36—36 of FIG. 35.

FIG. 37 is a view in an X-Z plane, partially in section, of a workpiece gage mounted on the tool bar.

FIG. 38 is a sectional view in a Y-Z plane of the workpiece gage.

DESCRIPTION OF THE PREFERRED EMBODIMENT

The tool calibration system which includes a tool calibration fixture and a tool height and offset calibration insert was designed for use with the omega-X micromachining tool system. In order to disclose the best mode of the invention a detailed explanation of the omega-X micromachining tool system is included. Then the structure of the tool calibration fixture and the calibration insert are described with a explanation of how they are used with the omega-X micro-machining tool system.

Figure 1:
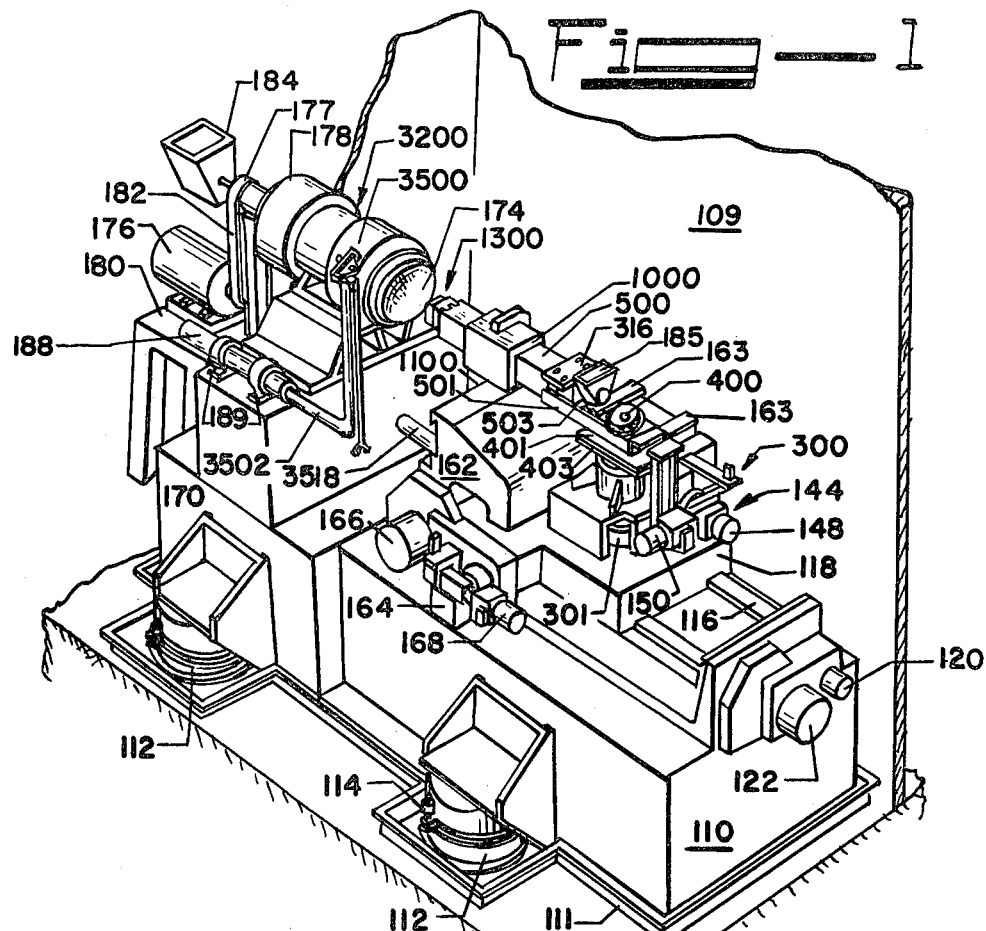
FIG. 1 is a perspective view of an omega-X micromachining tool with its enclosure partially broken away.

The omega-X micromachining tool system is comprised as shown in FIG. 1 of a number of major components. Each major component of the tool system is shown in detail in succeeding figures. Calibration instruments are not shown in FIG. 1. Some of the components are conventional and may be found in many machine tools other than the omega-X system. In the description, reference numbers identify not only parts, but generally also identify the figure (a) in which the part is best shown, and (b) in connection with which the part is originally discussed. Also, by using FIG. 1, the figures showing any component in greater detail may be readily ascertained by referring to the reference number. In a three-digit reference number, the first digit denotes the figure; in a four-digit reference number, the first two digits denote the figure; e.g., part 1000 is shown in FIG. 10; the discussion accompanying FIG. 10 is the comprehensive description of this part. Constituents of part 1000 are given numbers 1002, 1004, etc.

FIG. 1 displays a machine base 110 supported by four air suspension mounts 112. The base 110 provides a rigid structure of considerable mass and high dimensional stability on which to mount the remaining machine components. Machine base 110 is aged and annealed steel; many of the other components are constructed of cast iron, one of the several suitable specifications being ASTM-A48-T60, known commercially as Meehanite, grade GM-60. Air suspension mounts 112 are used to maintain the machine in an exactly level attitude despite machine movements and charges in weight distribution by means of three fluidic level controls 114 two of which are mounted on the air suspension mounts 112 away from the drive motor and the third (not shown) at the front of the machine base 110. The entire micromachining tool is located within a room which has sound-dampening material on its walls to provide acoustic isolation. On top of the machine base 110 Z axis slideways 116 are mounted; the slideways provide support to a first slide, denoted as Z axis slide 118. A Z axis slewing motor 120 drives the Z slide 118 through a conventional ball-screw mechanism (not shown). Position of the Z slide 118 is indicated by a Z axis encoder 122. Note that the Z axis of the micromachining tool is not provided with a servodrive since Z axis motion is only used for rough positioning of the tool; in fact, the Z axis is locked during all machining movements. The position of the Z slide 118 may be determined to an accuracy of ±1250 nm by means of the Z axis encoder 122.

Atop the Z axis slide 118 are mounted several of the components which contribute to the great accuracy of the omega-X micromachining tool system. The first of these is an eccentric mechanism 300 which provides support and rotation of a hollow, elongated parallelepiped tool bar 500 in the omega axis. With no offset, as shown in FIG. 1, between upper and lower eccentric adjustment guides 401 and 403 which slide with respect to each other, the center of an eccentric reference ball 400 is on the Y axis, which here coincides with the vertical axis of the eccentric mechanism 300. The amount of offset of the ball 400 from the Y axis is determined by the relative displacement of the upper and lower eccentric adjustment guides 401 and 403. An omega axis servodrive 144 rotates the eccentric mechanism via a rotary table 301. The rotary table 301 is contained within the eccentric mechanism 300. The angular position of the rotary table 300 is determined by omega axis master and secondary encoders 148 and 150 which, in turn, supply this information to a dedicated computer (not shown) which controls the micromachining tool. The rotary table 301 is "Ultra-Precise" model manufactured by the Moore Special Tool Company and is accurate to ±2 seconds of arc; any rotary table may be used as long as the required accuracy standard is met. Trueness of rotation is 250 nm TIR.

Figure 3:
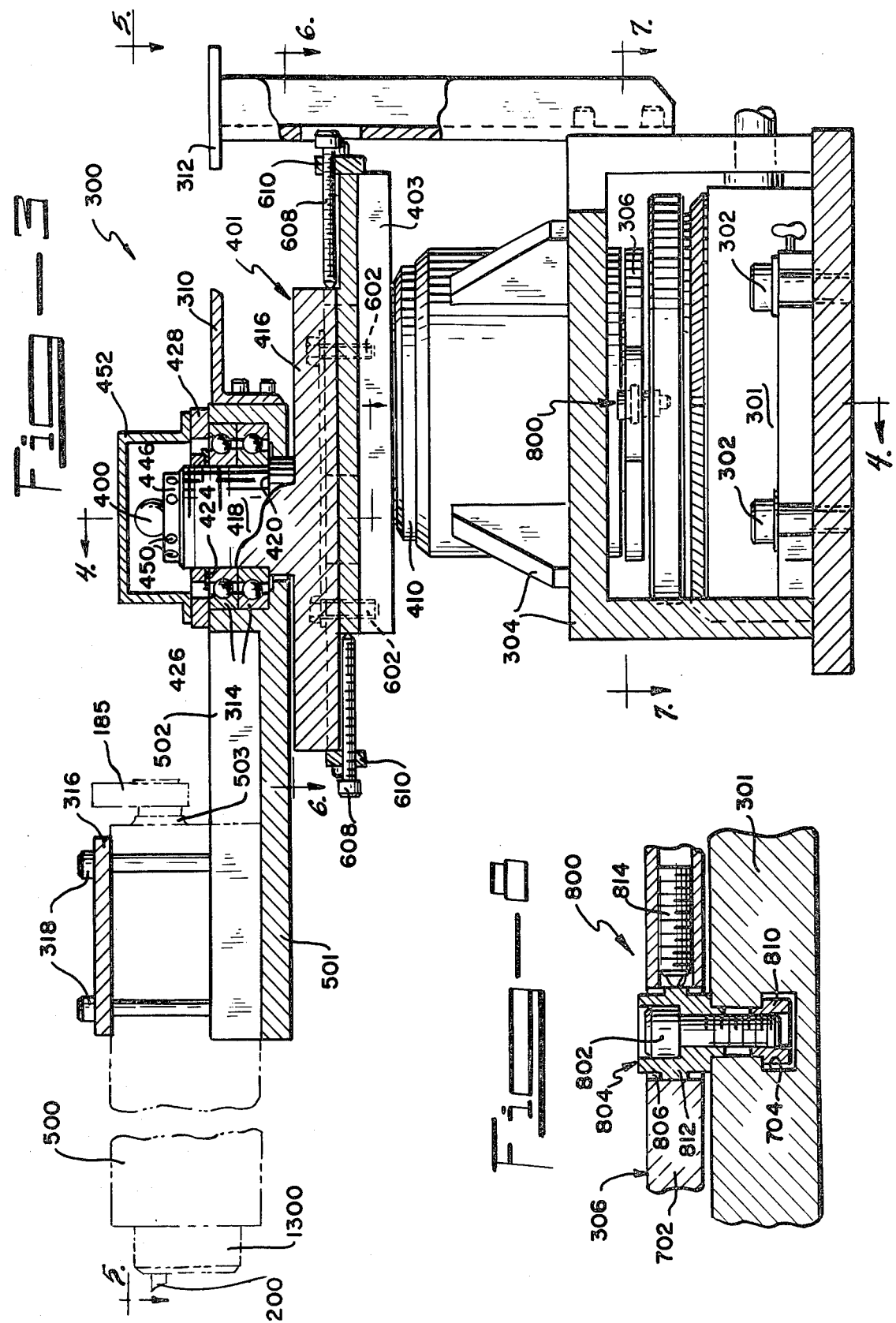
FIG. 3 is a view in a Y-Z plane, partially in section, of an eccentric mechanism and tool bar of the micromachining tool along line 3—3 in FIG. 4.

Next, a tool bar end bearing plate 501 is pivotally attached to the eccentric mechanism 300 through heavily preloaded angular-contact ball bearings 314, shown in FIG. 3. A tool bar 500 is fixed at one end to the tool bar end bearing plate 501 by a tool bar clamp 316 and shimming clamp 900 (not shown in FIG. 1). The tool bar 500 slides through and is supported by a linear air bearing 1000 which is pivotally supported by a pivot bearing 1100. The pivot bearing 1100 is attached to a second slide, denoted as X axis slide 162 which, like the eccentric mechanism 300, is mounted on X axis slideways 163 on the Z axis slide 118. Motion of the X axis slide 162 is controlled by the X axis servodrive 164 which contains a lead screw mechanism (not shown). Position of the X axis slide 162 is determined by the X axis master and secondary encoders 166 and 168 which, in turn, relay the position information to the dedicated computer. Each increment of motion of the lead screw in the servodrive 164 represents about 1 nm in the X axis. A tool head 1300 containing a tool bit 200 (not visible in FIG. 1) is mounted in the other end of the tool bar 500.

Mounted on a raised section 170 of the machine base 110 is a main air-bearing spindle 3200 which supports and rotates the workpiece 174. The spindle 3200 is rotated by a spindle drive motor 176 through a torque-smoothing pulley 177, a belt drive 182, and a vibrationless rotary coupling 178. Note that the spindle drive motor 176 is mounted on its own motor base 180 and that the motor base 180 is completely separate from the machine base 110. This feature, along with the pulley 177, the coupling 178, and the belt drive 182 connecting the motor 176 and driving side of coupling 178, all contribute to a reduction of unwanted motion in workpiece 174, thus increasing the accuracy of the omega-X micromachining tool system.

At one end of the main air-bearing spindle 3200 is mounted a funnel 184 for supplying coolant by gravity to the air-bearing spindle 3200 in order to accomplish thermal stabilization of the air-bearing spindle. Another funnel 185 is mounted to a hole 503 in an end of tool bar 500 nearer the eccentric mechanism 300; funnel 185 conducts oil coolant by gravity into tool bar 500.

Lastly, a tool gage 3500 mounted on gage arm 3502 may be rotated into position by a linear and rotary bearing quill 188 in order to determine the exact nose contour of the tool bit 200 mounted in the tool bar 500. The contour information is relayed to a dedicated computer. This further increases the accuracy of the omega-X micromachining tool system by enabling the dedicated computer to account for inaccuracies of as little as ±25 nm in the shape of the nose of the tool bit 200.

The entire micromachining tool system except for the spindle drive motor 176, motor base 180 and belt drive 182, is enclosed by a sound-dampened sheet metal housing 109 which anchors to a base pan 111. A cooling oil network (not shown) on the inside of the housing distributes oil over the micro-machining tool system to prevent temperature variations throughout its structure; oil is collected by the base pan 111. The sound dampening is necessary since even the sound of a human voice or a draft of air is capable of producing distortions in the workpiece 174 which are larger than the desired accuracy of system. For example, air currents generated by door movement have caused the micromachining tool, which weighs about seven metric tons, to move through an arc of 5 to 7 seconds.

Figure 2:
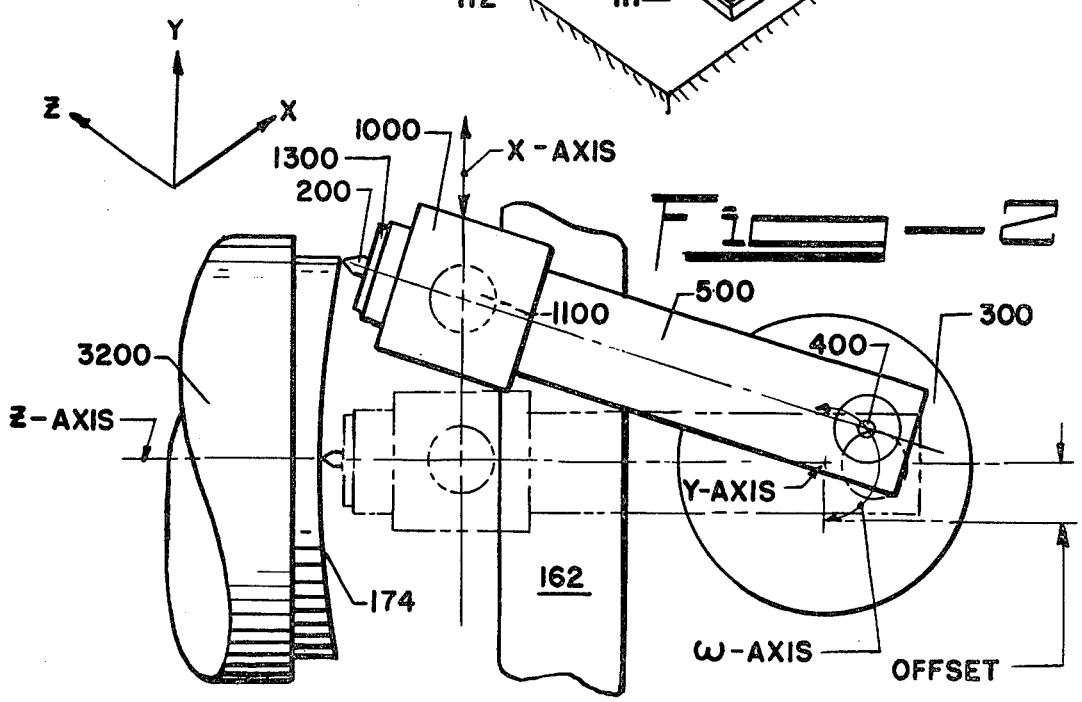
FIG. 2 is a schematic view of the axes of motion of the micromachining tool.

FIG. 2 describes the machining motions of the omega-X micromachining tool system. The X axis as displayed by FIG. 2 is parallel to the plane of rotation of the workpiece 174 and usually horizontal. Because the Z-axis slide 118 is stationary during actual machining movements, the Z axis is at a right angle to the X axis and coaxial with, rather than merely parallel to, the center of the main spindle 3200 and workpiece 174. As can be seen, motion in the X axis is produced by the X axis slide 162 being moved along the X axis by the X axis servodrive 164 shown in FIG. 1 so that the linear air bearing 1000, linked to the pivot bearing 1100 which moves with the X axis slide 162, also moves on the X axis, thus swinging the tool bar 500 about a pivot point centered at the eccentric reference ball 400. Consequently, as the linear air bearing 1000 is guiding the tool bar 500 through its arc, the air bearing 1000 is also rotating and sliding along the tool bar 500 toward the eccentric reference ball 400 and then away from it, assuming that a tool bit 200 mounted on the tool head 1300 and tool bar 500 is moving as shown by the second tool bar position, shown in phantom in FIG. 2.

The omega axis is the circular arc described by the eccentric reference ball 400 as it is rotated about the Y axis by the eccentric mechanism 300. In FIG. 2, the omega axis consists of a 180 degree arc of a circle on the side of the eccentric mechanism 300 away from the workpiece 174. (Arcs as great as about 300 degrees are possible.) The radius of the arc is varied by offsetting the eccentric reference ball 400 (and therefore the center of the Y axis) from the Y axis by means of the upper and lower eccentric adjustment guides 401 and 403 shown in FIGS. 1 and 6. Of course, if the eccentric reference ball 400 is on the Y axis, there will be no movement of the pivot point of the tool bar 500 regardless of rotation of the eccentric mechanism 300 and the tool bit 200 will merely swing in a pure circular arc centered on the Y axis. Note that, assuming offset is not zero, identical increments of rotation of the eccentric mechanism 300 give varying increments of motion of the eccentric reference ball 400 in the Z axis; this means that the amount of movement of the tool bit 200 toward and away from the workpiece 174 is controlled very precisely. The displacement in the omega axis is measured by the angle $\omega$ formed between the Z axis and the radius on which the pivot point, represented by reference ball 400, lies. In the present embodiment, it is anticipated that this increment will vary from 0 to 4.4 nm. Presently available systems employ an increment of about 25 nm as the smallest increment of motion. The dedicated computer is programmed by conventional mathematical methods to calculate the necessary movements in both X and omega axes, given desired contour of the workpiece 174 and the accuracy required, assuming that the micromaching tool system has been previously calibrated.

The preceding description of the micromachining tool system and its axes of machining movement give the reader a general concept of the function of each major component and its interrelationship with other components. Next will follow a detailed description of each of the major components of the omega-X micromachining tool system.

The first such component to be described in detail is the eccentric mechanism 300 which is displayed in greater detail in FIGS. 3 through 7. The purposes of the eccentric mechanism 300 as shown in FIG. 3 are several. First, it must provide a support for one end of tool bar 500. Second, it must provide rotation in the omega axis. Third, it must be able to accomplish the variable offset required to determine the radius of the omega axis. Fourth, it must reduce mechanical backlash or eliminate it wherever possible in order to provide the most precise control of movements of the tool bit 200.

The rotary table 301 of the eccentric mechanism 300 is attached by bolts 302 to the inside of the eccentric mechanism housing 304 which supports the lower eccentric adjustment guide 403 and through it, the remainder of the eccentric mechanism 300, and provides a protective cover and support for the internal portions of the eccentric mechanism. The rotary table 301 is connected to a driving plate 306 by pivot link 800 which is more clearly shown in FIG. 8.

Figure 7:
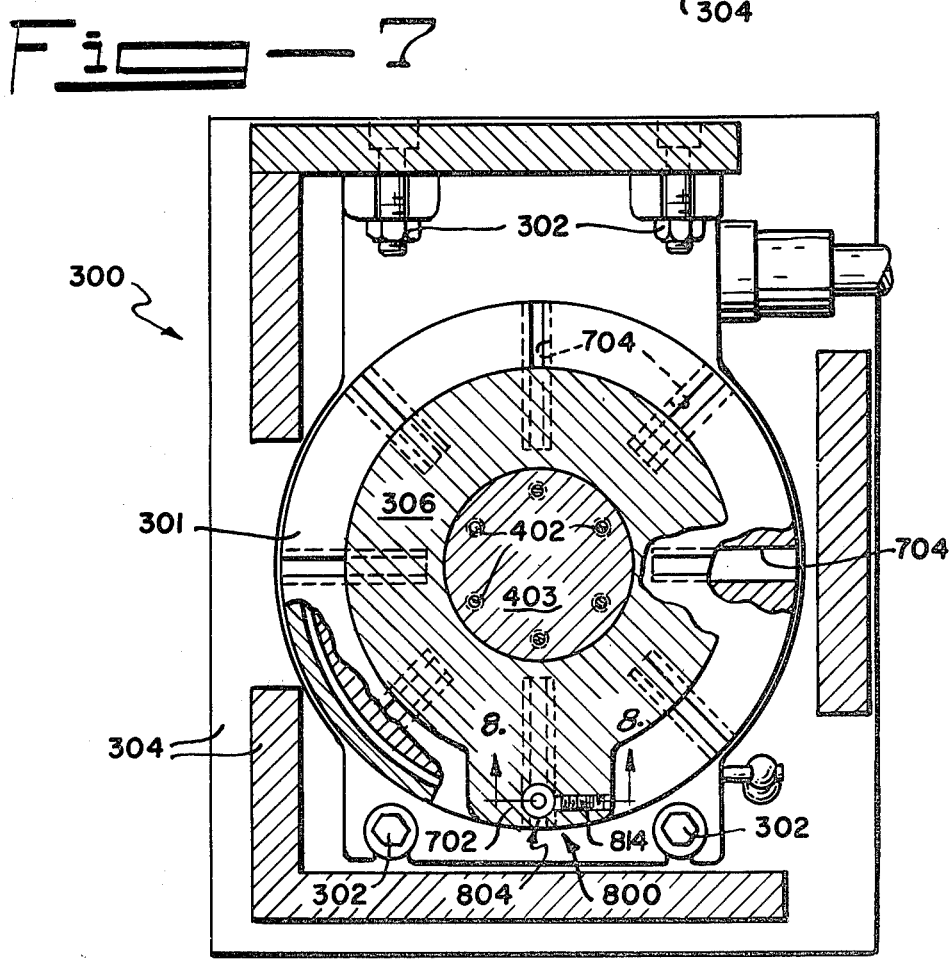
FIG. 7 is a sectional view in an X-Z plane of an eccentric rotating mechanism in the eccentric mechanism along line 7—7 of FIG. 3.

Referring briefly to FIG. 8, pivot link 800 is comprised of a cap screw 802 surrounded by an annular lug 804 mounted in a hole 806 on a peripheral tang 702 of driving plate 306; the tang 702 is best shown in FIG. 7. Screw 802 and lug 804 extend below driving plate 306 into one of slots 704 in rotary table 301 having the shape of an inverted "T" and extending from the edge of the rotary table 301 a distance toward its center along a radius of the table; the slot 704 contains a T-nut 810 having threaded engagement with cap screw 802 which extends into slot 704 farther than does annular lug 804. A smaller diameter portion on the bottom side of lug 804 has a close fit with the narrower portion of slot 704 and hence torque may be transmitted from rotary table 301 through lug 804, which is retained firmly against rotary table 301 by cap screw 802 and T-nut 810, to driving plate 306. The portion of annular lug 804 which passes through the hole 806 is sufficiently smaller than hole 806 to avoid contact with the hole except for a raised collar 812 which has sliding contact with a spring plunger 814 and the inside of hole 806. Spring plunger 814 lies in an X-Z plane as does driving plate 306 and has threaded engagement with the plate. Spring plunger 814 projects into hole 806 and provides a constant contact pressure between raised portion 812 and hole 806 so that backlash is minimized and reduced to a constant amount regardless of the direction of rotation of the rotary table 301. As shown in FIG. 7, the pivot link 800 is as far away from the center of driving plate 306 as possible to reduce the effect of backlash and the deflection caused by the force giving rise to the moment rotating plate 306.

Figure 4:
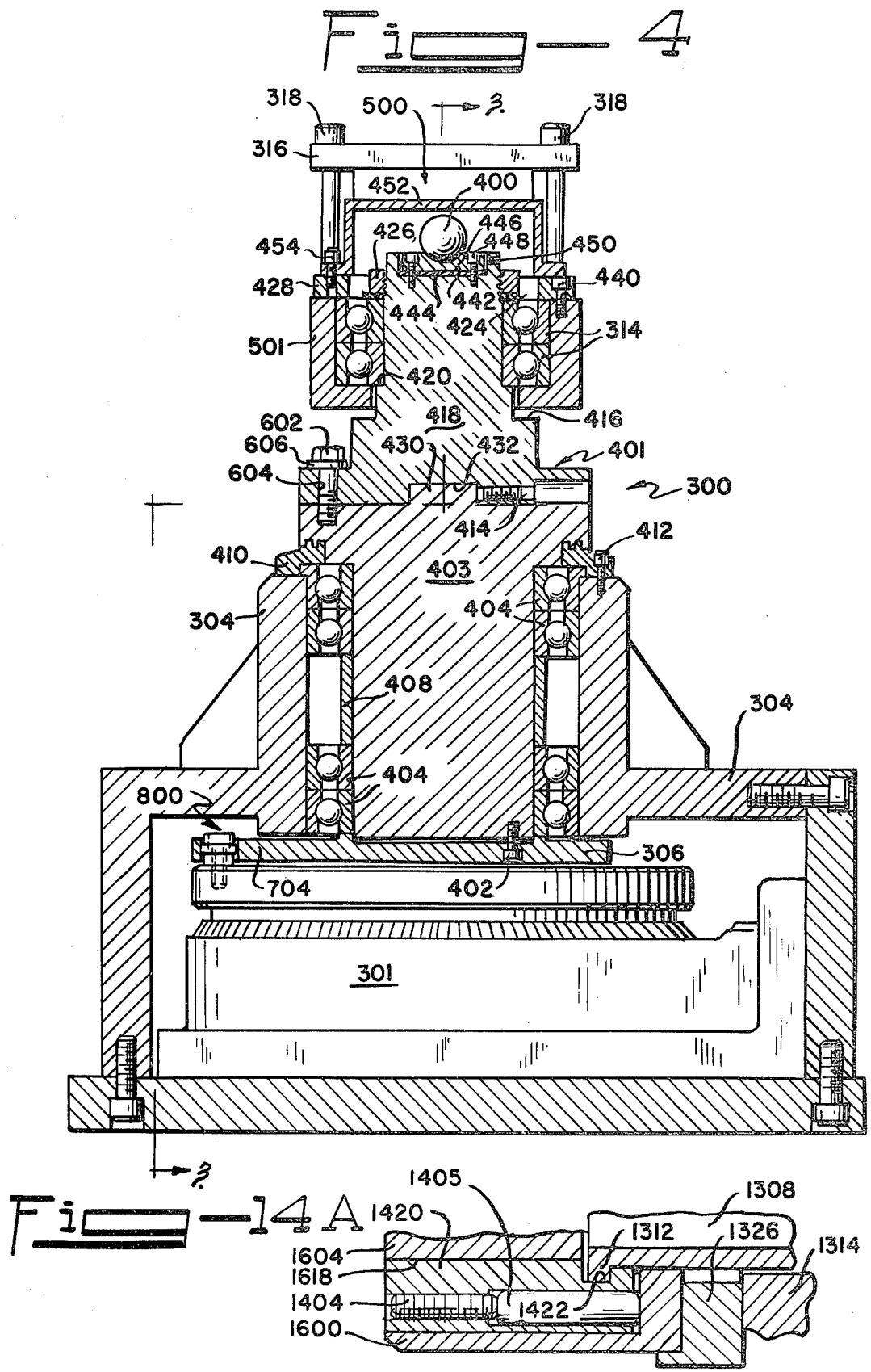
FIG. 4 is a sectional view in an X-Y plane of the eccentric mechanism along line 4—4 of FIG. 3.

Turning to FIG. 4, driving plate 306 is secured to lower eccentric adjustment guide 403 by cap screws 402. As may be seen from FIGS. 3 and 4 in conjunction, lower eccentric adjustment guide 403 is an integral solid comprised chiefly of a rectangular plate with an integral cylindrical column extending from the plate into a hollow cylindrical portion of eccentric mechanism housing 304. The lower eccentric adjustment plate 403 is supported within the housing 304 by heavily preloaded angular-contact ball bearings 404 which also further reduce mechanical backlash in the eccentric mechanism 300. Driving plate 306, a spacer 408, a labyrinth ring 410 and the lower eccentric adjustment guide 403 combine to locate the inner and outer races of ball bearings 404 and thus preload the bearings. Because the rotation of the eccentric mechanism 300 is limited to less than one complete revolution, bearings 404 contribute to a high degree of repeatability because each ball tends to act as though geared to the races it is held between. Dimensional changes in the eccentric mechanism 300, which might occur when the eccentric mechanism is calibrated in a given position and then later returned to that position, are minimized.

Labyrinth ring 410 engages eccentric lower adjustment guide 403 in a double tongue-and-groove relationship and is secured to eccentric mechanism housing 304 by cap screws 412. The purpose of the labyrinth seal formed by guide 403 and ring 410 is to insure that particles resulting from machining operations are not carried into bearings 404 by the oil bath on the micromachining tool system. Were particles to reach bearings 404, the accuracy of the system would be destroyed.

Figure 6:
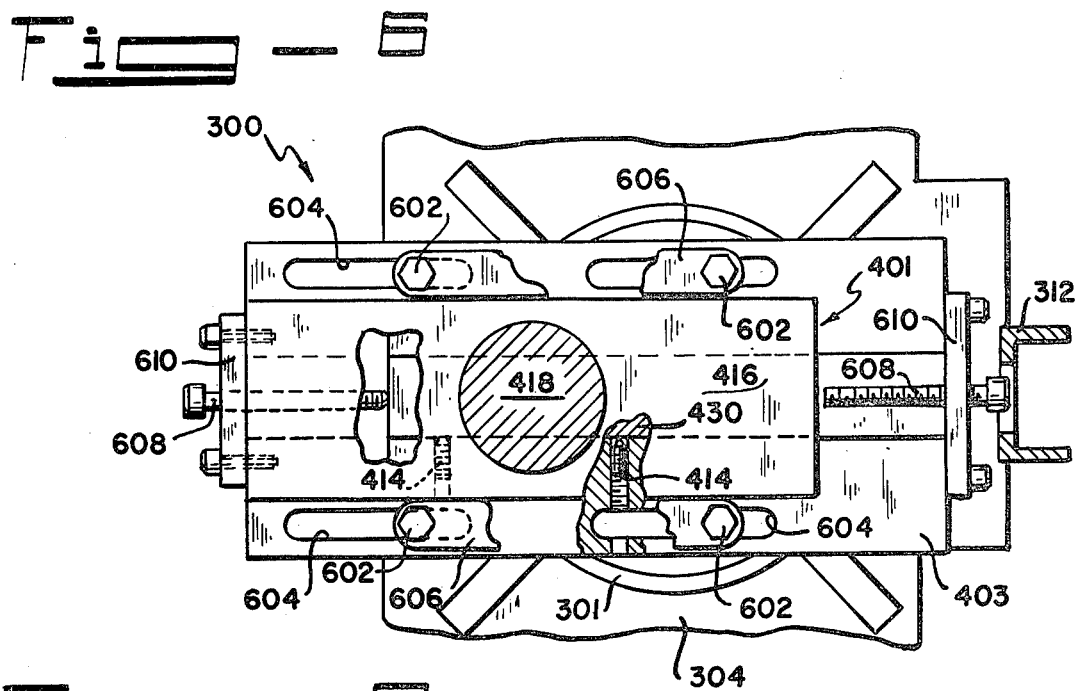
FIG. 6 is a detail view in an X-Z plane, partially in section, of eccentric adjustment guides in the eccentric mechanism along line 6—6 of FIG. 3.

As can be seen in FIGS. 3 and 6, upper and lower guides 401 and 403 can slide with respect to each other. A tongue 430 on lower guide 403 engages a groove 432 on upper guide 401; refer also to FIG. 4. For repeatability and reduction of backlash, constant contact pressure is maintained between tongue 430 and groove 432 by two spring plungers 414 bearing against the tongue 430. The spring plungers 414 have threaded engagement with the rectangular plate portion of upper guide 401. The actual amount of offset in the present version of the micromachining tool system is about 10 cm. The offset from the Y axis is measured by a laser interferometer using interferometer platforms 310 and 312, shown in FIG. 3; platform 310 moves with the upper eccentric adjustment guide 401 and platform 312 is stationary with respect to housing 304, sine it is fixed thereto. Upper and lower eccentric adjustment guides 401 and 403 are clamped together by cap screws 602 passing through slots 604 in the upper guide 401 and having threaded engagement with the lower guide 403. A strap washer 606 is used for each pair of cap screws so that, when the guides 401 and 403 have been offset, tightening of a cap screw 602 will not turn a conventional washer under the cap screw which could conceivably cause relative movement between the guides.

Offsetting of guides 401 and 403 is accomplished by offset screw 608 shown in FIG. 6 which has threaded engagement with a screw mount 610 attached to an end of the rectangular plate of upper adjustment guide 401. An inner end of offset screw 608 bears against an end of the rectangular plate of lower adjustment guide 403 and hence the combination of offset screw 608 and upper adjustment guide 401 behaves as a traveling nut mechanism. The offset may be set to an accuracy of ±125 nm and calibrated to an accuracy of ±25 nm by laser interferometer.

Continuing with FIG. 4, the upper eccentric adjustment guide 401 is roughly similar in shape to the lower guide 403, that is, a generally rectangular plate with a cylindrical column extending from the rectangular plate. The rectangular plate portion of guide 401 contains on its lower side the groove 432 which mates with the tongue 430 on lower guide 403. The upper guide 401 also contains the slots 604 shown in FIG. 6 and previously described. On the side of the rectangular plate opposite the groove 432 in guide 401 is a central rib 416 wider and higher than the groove and extending parallel to the groove for the full length of the rectangular portion of the upper guide 401; the rib adds rigidity and mass to the upper guide 401 and substitutes for the strength lost due to the groove 432.

Referring principally to FIG. 4, extending from the rib 416 on top of the eccentric adjustment guide 401 is a cylindrical column 418 which supports the tool bar end bearing plate 501 and eccentric reference ball 400. The column 418 has a larger diameter portion nearer its juncture with rib 416. The larger diameter portion is connected to the remainder of the cylindrical column by a ledge 420, the surface of which is at a right angle to the axis of the cylindrical column 418. Ledge 420 supports the inner races of two courses of heavily preloaded angular-contact ball bearings 314. Bearings 314 permit rotation of the tool bar 500 and tool bar end bearing plate 501 by the linear air bearing 1000 with respect to column 418. At the same time, bearings 314 minimize backlash along and transverse to the axis of column 418, behaving in the same fashion as bearings 404 and 406 on the lower guide 403. The inner races of bearings 314 surround column 418 and are clamped between ledge 420 and a lock washer 424 and lock nut 426 having threaded engagement with an end of cylindrical column 418. The outer races of bearings 314 are clamped in place between the bottom inside surface of tool bar end bearing plate 501 and a locking ring 428 attached to tool bar end bearing plate 501 by cap screws 440.

The top of column 418 has a circular recess 442, the base of which is parallel to the X-Z plane. Next, a shim 444 rests in the bottom of the recess 442 for Y axis adjustment. A disk 446 placed on top of the shim 444 has a spherical depression in its upper surface the same radius as the eccentric reference ball 400 which rests in the depression. The disk 446 and sim 444 may be clamped in position in the recess by cap screws 448. The height of the eccentric reference ball 400 is adjusted so that the center of the ball is at the same height as the Z axis passing through the center of the workpiece 174. The center of the eccentric reference ball 400 is adjusted by set screws 450 to place the center of the ball exactly on the Y axis as well. Set screws 450 have threaded engagement with the circular column 418 and bear against the periphery of disk 446. The accuracy of location of the ball 400 on the axes described is ±250 nm with respect to the Y and Z axes. Cover 452 anchored to locking ring 428 by screws 454 protects the ball 400 when measurements are not being made. It also prevents contaminants from entering bearings 314.

Figure 5:
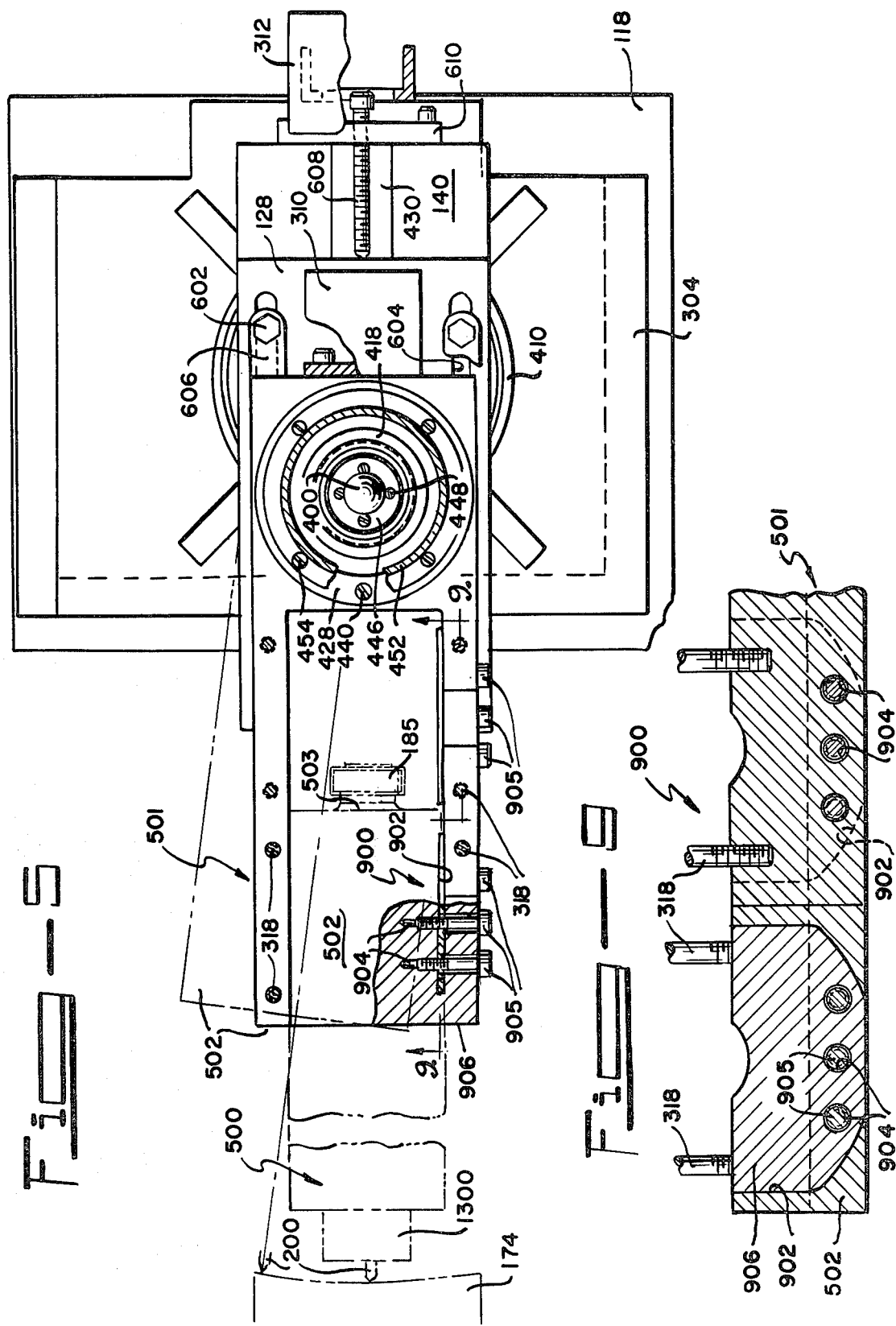
FIG. 5 is a plan view in an X-Z plane of the eccentric mechanism and tool bar along line 5—5 of FIG. 3.

Tool bar end bearing plate 501 is essentially a cantilevered beam extending from cylindrical column 418 and supporting tool bar 500. Referring to FIG. 5, one end of the bearing plate 501 has an open-ended trough 502 in it of the same width as the tool bar 500. The tool bar 500 rests in trough 502, also shown in FIG. 3. The bottom of trough 502 lies in an X-Z plane. The tool bar 500 is clamped in place by tool bar clamp 316 shown in FIG. 3 which is attached to bearing plate 501 by cap screws 318.

Referring to FIGS. 5 and 9 in conjunction, shimming clamp 900 is comprised of two semicircular slots 902 which lie on one side of the trough 502 in a Y-Z plane and which separate the bottom of the trough from the side of the tool bar end bearing plate 501. The dual arrangement permits shimming of the tool bar 500 no matter where it rests in trough 502; in FIG. 5, only the slot 902 away from the eccentric mechanism 300 is actually in use. Each slot 902 is intersected by three blind holes 904; all three penetrate the side of plate 501, pass through the slot 902 and shim 906 and terminate in the base of the trough 502 a distance beyond each slot 902. The holes 904 are perpendicular to the plane of the slots 902. The slots 902 and blind holes 904, which are threaded to receive cap screws 905, cooperate to hold shims 906 inserted between the sides of the tool bar 500 and trough 502 to adjust the position of the tool bar 500 with respect to the Z axis; the tool bar must lie parallel to the Z axis within ±125 nm. Shims 906 are curved to match slots 902 on their lower edges, have holes through which cap screws 905 pass, and extend above slots 902 between tool bar 500 and the side of trough 502 to provide the shimming effect. Also, additional clamping effect on the tool bar 500 is provided.

The end of the tool bar 500 away from the tool bar end bearing plate 501 is supported by the linear air bearing 1000 and pivot bearing 1100 which is attached to the X slide 162. Referring to FIGS. 10, 11 and 12, the tool bar 500 slides through the linear air bearing 1000 and is attached movably thereto by bellows 1002 and 1004. Bellows 1002 and 1004 prevent entry of oil and machining particles into the linear bearing 1000 while still permitting movement of tool bar 500. The linear air bearing 1000 has the shape of a parallelepiped with a cylindrical stub 1006 projecting pendently from the bearing. Linear air bearing 1000 is split into upper half 1102 and lower half 1104 along a diagonal as shown in FIG. 11. Construction of linear air bearing 1000 in two segments 1102 and 1104 permits easy disassembly and removal of tool bar 500 from the bearing 1000. Halves 1102 and 1104 are not in contact with each other. Tool bar 500 rests on an air film issuing from oval graphite pads 1008; a row of these graphite pads 1008 is mounted on each of the inner surfaces of halves 1102 and 1104. The long axes of the oval pads 1008 are parallel and at right angles to the Z axis. The graphite pads 1008 in the upper half 1102 are held against tool bar 500 by a rocker arm 1106 and rocker ball 1108. Ball 1108 is trapped between spherical depressions 1110 and 1112 in the upper half 1102 of the linear air bearing 1000 and rocker arm 1106 respectively; the depression 1110 in upper half 1102 is located on the edge formed by the intersection of the outer surfaces parallel to the Y-Z and X-Z planes of upper half 1102 and approximately midway along the length of the linear air bearing 1000 in the direction of the Z axis. The depression 1112 in rocker arm 1106 is located at the intersection of the horizontal and vertical surfaces of the arm nearer upper half 1102 so that, when rocker arm 1106 is attached to lower half 1104 by cap screws 1114 having threaded engagement only with lower half 1104, the ball will be trapped in the aforementioned depressions 1110 and 1112. Note that cap screws 1114 pass through holes 1116 in upper half 1102 and have no contact with upper half 1102. The purpose of this arrangement is to permit upper half 1102 to rotate in a small arc having as its center of rotation the center of ball 1108. This is necessary to insure identical spacing of graphite pads 1008 from all four sides of the tool bar 500; uneven pressure on one side of tool bar would result in an error in the position of the tool bit 200 shown in FIG. 10.

Returning to FIGS. 10 and 11, each graphite pad 1008 is seated in an oval recess 1010 slightly larger than the pad. Air at a pressure of about 483 KPa is supplied through primary air passages 1118 and secondary air passages 1120 to troughs 1122 parallel to the long axis of each oval recess 1010 and formed in the base thereof. The air then passes through the porous graphite pads 1008 and supports the tool bar 500 about 6250 nm away from the pads. By supporting tool bar 500 in this fashion, friction is reduced to the minimum possible value and the tool bar is provided with equal support on all four sides, thus tending to reduce backlash and provide repeatability in the movements of tool bar 500. Also, as tool bar 500 moves from side to side or up and down in air bearing 1000, the air pressure on that side will increase due to the smaller gap, thus tending to push the tool bar 500 away since air pressure on the opposite side of the tool bar 500 will have decreased due to the larger gap. The wavelength of the errors (about ±25 nm) in the surfaces of the tool bar 500 are around 5 cm; this is short compared to the length of the linear air bearing 1000, about 22.5 cm. Hence, the air bearing 1000 averages the errors in tool bar 500, resulting in erroneous movements of the tool bar 500 considerably less than ±25 nm.

The linear air bearing 1000 is supported by the pivot bearing 1100 via two double courses of heavily preloaded angular-contact ball bearings 1012. The inner races of the upper set of ball bearings 1012 surround the cylindrical stub 1006 where the stub joins lower half 1104. The inner races of the other set of bearings 1012 surround cylindrical stub 1006 at the end of the stub away from lower half 1104. The inner races are separated by spacer 1014. The outer races of both sets of bearings 1012 have an interference fit with pivot bearing housing 1016 which is in turn attached to X slide 162 by cap screws 1202, shown best in FIG. 12, having threaded engagement with X slide 162. Also, the outer race of the bottom course has a flange 1013 which is trapped in a mating recess on pivot bearing housing 1016 by an end plate 1022 which is retained against the housing 1016 by cap screws 1024. The inner races of the lower set of bearings 1012 are held against spacer 1014 by a bearing plate 1018 attached to stub 1006 by cap screws 1020. The end of pivot bearing housing 1016 is closed by end plate 1022.

A synthetic rubber O-ring gasket 1026 is trapped between annular flanges 1028 and 1030 extending downward from the bottom of lower half 1104 and upward from the upper end of pivot bearing housing 1016, respectively. The flanges 1028 and 1030 overlap;

flange 1028 surrounds flange 1030 and O-ring gasket 1026 is trapped therebetween. The O-ring gasket 1026 protects the pivot bearing 1100 against contamination of particulates resulting from machining operations.

Support and adjustment of the tool bit 200 is accomplished by the tool head 1300 shown in detail in FIGS. 13, 14, 14A, 15 and 16. The tool head 1300 permits adjustment of the tool bit 200 in X, Y and Z directions. Furthermore, it supports one end of a tool bar length standard 1900 described later.

Referring jointly to FIGS. 13, 14, 15, and 16, the tool head 1300 consists of a head piece 1600 which supports a tool holder 1402, best shown in FIG. 14, in which tool bit 200 is mounted. Head piece 1600 provides for adjustment of tool bit 200 along the Z axis; for adjustment in the X and Y directions, both head piece 1600 and tool bit 200 are moved. Head piece 1600 contains a rectangular opening 1602 in its front face 1604 which faces the workpiece 174. The opening 1602 lies along the Z direction and receives tool holder 1402; contiguous to a portion of the bottom of opening 1602 is a trough 1606 which receives a tab 1408 on tool holder 1402 which has threaded engagement with one end of a differential screw 1306. The trough 1606 terminates in a front face 1604 of the head pice 1600. The other end of differential screw 1306 has threaded engagement with head piece 1600 in threaded hole 1608 which extends from trough 1606 away from the front face 1604. Thus, by adjustment of differential screw 1306, the tool holder 1402 and tool bit 200 may be moved in or out of head piece 1600 in the Z direction.

When adjusted to the desired position, tool holder 1402 can be clamped in position by screws 1501 in FIG. 15 having threaded engagement with holes 1610 in head piece 1600 and bearing against a gib 1410 which forces the gib against tool holder 1402 and clamps the tool holder in position between the gib 1410 and the sides of rectangular opening 1602. Gib 1410 closely fit a triangular space formed by two sides of rectangular opening 1602 and a blunted edge of tool holder 1402. Two screws 1501 are used to adjust gib 1410; the center screw 1501 locks tool holder 1402 in position.

Referring to FIG. 15, tool bit 200 is positioned in a close fitting rectangular tool bit hole 1500 the axis of which is parallel to the Z axis; the tool bit is locked in position by driving an offset portion of rotating cam 1504 against tool lock plunger 1508 which is mounted slidably in a plunger hole 1510 which is in communication with both cam hole 1506 and tool bit hole 1500; plunger 1508 has a "V" cut in its end bearing against tool bit 200. Cam hole 1506 communicates with a front face 1409 of tool holder 1402 and is rotated by a wrench. A spring plunger 1512 having threaded engagement with tool holder 1402 engages a notch in tool lock plunger 1508 and retains plunger 1508 in plunger hole 1510 when the tool bit 200 is removed.

Head piece 1600 is attached to tool bar 500 by a spool 1308 shown partially broken away in FIG. 13; spool 1308 is a hollow cylinder, with its axis parallel to the Z axis and having a flange 1310 at one end and diametrically opposed ears 1312 at the other end. The flange 1310 engages a mating flange 1314 on a hole at the end of tool bar 500 when the spool 1308 is inserted through the hole. The head piece 1600 surrounds the end of the spool 1308 having ears 1312; the ears 1312 bayonet lock with head piece 1600 by passing through gaps 1612 in a flange 1614 on a rear face 1616 of head piece 1600; and rotating the spool 1308 to engage the ears 1312 with the flange 1614. The spool is inserted from the rear of tool bar 500 and flange 1314 has gaps not shown which are similar to gaps 1614 to allow passage of the ears 1312. A drain hole 1615 allows oil supplied to tool bar 500 via funnel 185 and hole 503 to drain out of the tool bar.

The spool 1308 passes through an X-direction guide 1316 and traps it between tool bar 500 and head piece 1600.

Once inserted into the head piece 1600 and rotated, the spool 1308 is locked by friction locks (refer to FIGS. 14, 14A, 15, and 16) comprised of cylindrical slugs 1420 each having a slot 1422 and closely fitting in blind lock holes 1618 in head piece 1600 which interrupr a groove 1620 behind flange 1614 and communicate with front face 1604; ears 1312 on spool 1308 rest in groove 1620. Slots 1422 are formed in the curved surface of slugs 1420, with the long axes of the slots forming right angles with the long axes of the cylindrical slugs. The slots 1422 in slugs 1420 are aligned with groove 1620 and of slightly less width; ears 1312 are turned far enough to engage simultaneously the slots and groove 1620. A screw 1404 has threaded engagement with each slug 1420. One end of the screw bears against an end of a dowel 1405 mounted slidably within the slug. Turn to FIG. 14A; the long axes of screw 1404 and dowel 1405 lie on the same straight line, parallel to but offset from the long axis of the slug 1420. The opposite end of screw 1404 is adjustable at an end of slug 1420 at face 1604 of head piece 1600; the opposite end of dowel 1405 protrudes from the opposite end of slug 1420 and bears against a flat bottom of blind lock hole 1618. Turning screw 1404 moves dowel 1405 out of slug 1420; the slug moves toward front face 1604, thus causing one side of slot 1422 to press firmly against a a surface of ear 1312 nearer the tool bar 500. Consequently, since spool 1308 is engaged with flange 1314, the head piece 1600 and the X direction guide 1326 are brought tightly against tool bar 500. Furthermore, the binding effect between slot 1422 and ear 1312 prevents rotation of the spool 1308.

The tool bar has two Y direction guide rails 1412 in a Y-Z plane formed by extension of each side of the tool bar 500 beyond the end of the tool bar. A parallelepipedal X direction guide 1316 rests between the guide rails 1412. The guide rail 1316 fits closely between guide rails 1412 and can slide in the Y direction between the guide rails. The position of tool bit 200 in the Y direction is controlled by set screws 1322 having threaded engagement with tabs 1324 and bearing against the top and bottom surfaces of the X direction guide 1316. Tabs 1324 are screwed to the top and bottom surfaces of tool bar 500.

X direction guide 1316 has a large spool hole 1326 through its center which permits spool 1308 to pass through the guide and also provides space for the tool bar length standard 1902. X direction guide 1316 has two rails 1328 formed as extensions of its top and bottom surfaces in X-Z planes. Head piece 1600 fits closely and slidably between guide rails 1328 and may be moved in the X direction by adjusting set screws 1414 which have threaded engagement with Y-direction tabs 1416 projecting beyond the end of the tool bar 500 and which bear against the side surfaces of head piece 1600. X-direction tabs 1416 are screwed to X direction guide 1316 and project. Therefore, tool bit 200 may be adjusted in the X, Y and Z directions by making adjustments only to tool head 1300; once initial calibration is complete, the entire setup calibration, necessary with each tool change, is accomplished by adjustments at the tool head 1300 only.

Initial calibration is accomplished with a pivot axis calibrating device 1700, the tool bar length standard 1900, a tool bar length calibration insert 1922, a tool height and offset calibration insert 2300 and a tool calibration fixture 2600. Setup calibration is accomplished by the tool calibration fixture 2600, and a mastering station 2900, all described below.

Prior to use, the omega-X machine must be initially calibrated with a pivot axis calibrating device 1700 which permits the distance between the Y axis and the pivot axis of the pivot bearing 1100 to be established with an accuracy of ±25 nm; this distance is then supplied to the dedicated computer. The Y axis is represented by the eccentric reference ball 400 and the pivot axis, which is parallel to the Y axis, of the pivot bearing 1100 is represented by a pivot reference ball 1704 supported on the pivot bearing 1100 by an adjustable support 1703 identical to column 418, recess 442, shim 444, disk 446, cap screws 448, and set screws 450. The position of the pivot reference ball 1704 may be adjusted in the same fashion as that described for the eccentric reference ball 400. The pivot axis calibrating device 1700 consists essentially of a standard of known length with a linear variable differential transformer used to make a fine adjustment to the known standard. The hollow calibrating device shaft 1706 is made of a stable corrosion and wear-resistant material such as a nitrided steel whose length is calibrated and certified by the National Bureau of Standards or by a metrology laboratory with gages traceable to the National Bureau of Standards. Mounted concentrically within the shaft 1706 is an air-operated linear variable differential transformer (LVDT hereinafter) which is a commercially available length measurement device attached to an electrical power source, air source, and readout instrument by cable 1710. The position of the LVDT 1708 may be adjusted by a surrounding differential screw 1712 rotatable by means of a manually operated ring 1714 accessible through a hole 1716 in the shaft 1706. LVDT 1708 is clamped tightly in a front nut 1718 by a clamp screw 1720. Front nut 1718 has threaded engagement with one end of the differential screw 1712 and fits slidably inside shaft 1706. Key 1719 slides in keyway 1721 and prevents rotation of front nut 1718; see FIG. 19. Two spring plungers 1723 having threaded engagement with front nut 1718 bear against the inner surface of shaft 1708 and insure contact pressure; holes 1725 allow access to adjust the spring plungers. The other end of differential screw 1712 has threaded engagement with rear nut 1722 which is fixed inside shaft 1706 by set screw 1724 which expands a split portion of rear nut 1722 against the interior of shaft 1706. Set screw 1724 is accessible through hole 1726 in shaft 1706. At the end of shaft 1706 opposite the LVDT 1708, two diametrically opposed pins 1802 extend from the exterior of shaft 1706. Pins 1802 provide support for a rubber band 1804 which is used to bring a flat reference surface 1734 on a closed end of shaft 1706 against the pivot axis reference ball 1704. The contact is minimized by using a rubber band and made repeatable by using the same type and size of rubber band. Excessive contact pressure between the reference surface 1734 and pivot axis reference ball 1704 could cause a slight indentation and erroneous readings on the order of 75 nm.

Shaft 1706 is supported by half sleeves 1728 and 1730, each of which is held against the upper portion of shaft 1706 by rubber bands 1738 and extends beyond an end of shaft 1706. Half sleeve 1728 also rests atop pivot axis reference ball 1704, while half sleeve 1730 rests atop eccentric reference ball 400; the half sleeves support shaft 1706 so that the center lines of the shaft 1706 and LVDT 1708 are coaxial with the Z axis on which both the eccentric reference ball 400 and pivot reference ball 1704 must be located before the pivot axis calibrating device 1700 is employed.

In use, a zero reading of the LVDT 1708 is established by wringing a gage block (not shown) against a lapped open end 1736 of the shaft 1706 through which the probe 1732 of the LVDT 1708 extends; the probe 1732 is adjusted by ring 1714 to contact the gage block and the LVDT 1708 output is then adjusted to a null reading. The pivot axis calibrating device 1702 is then placed between reference balls 400 and 1704 and is held in contact with pivot axis reference ball 1704 by rubber band 1804. The reference balls 400 and 1704 have previously been adjusted so that their centers lie on the Z axis and, in the case of eccentric reference ball 400, on the Y axis and, in the case of pivot axis reference ball 1704, on the pivot axis of the pivot bearing 1100 to an accuracy of ±25 nm. The distance between the centers of balls 400 and 1704 must be determined by conventional means to approximately 0.0127 cm beforehand. Once the pivot axis calibrating device 1700 is in position, the LVDT 1708 is moved by air through cable 1710 until the probe 1732 contacts eccentric reference ball 400, at which time the LVDT correction to the known standard length of shaft 1706 is determined, thus measuring to an accuracy of ±25 nm the distance between the centers of eccentric reference ball 400 and pivot reference ball 1704. This dimension is supplied to the dedicated computer.

Because conventional means do not provide sufficient accuracy in calibration of the tool position with reference to the eccentric reference ball 400, a tool bar length standard 1900 is employed. The length standard 1900 is in several respects functionally and structurally similar to the pivot axis calibrating device 1700. The purpose of the tool bar length standard 1900 is to locate a point in space along the Z axis exactly one meter away from the center of the eccentric reference ball 400, the center of which is located both on Y and Z axes. Length standard 1900 employs a known length calibrated and certified by the National Bureau of Standards or by a metrology laboratory with gages traceable to the National Bureau of Standards. The standard length is correctable by means of an LVDT 1708 used in exactly the same manner as in pivot axis calibration device 1700.

Referring to FIG. 19, the tool bar length standard 1900 is composed mainly of a hollow multidiameter shaft 1904. The shaft 1904 contains the LVDT 1708 whose probe 1732 rests against the eccentric reference ball 400. The common axes of the shaft 1904 and LVDT 1708 lie on the Z axis. The LVDT 1708 is adjustable by means of a differential screw 1712 which has threaded engagement with front and rear nuts 1718 and 1722.

The tool bar length standard 1900 passes through the hollow tool bar 500. FIGS. 1 and 5 show a tool bar length standard hole 503 through which the standard 1900 passes. At the end of standard 1900 away from reference ball 400 the shaft 1904 passes out of tool bar 500, through spool 1308, head piece 1600 and protruding from a tool bar length calibration insert 1922, which is installed in head piece 1600 in place of tool holder 1402. Besides supporting one end of the length standard 1900, the calibration insert 1922 permits the end of the length standard 1900 to be aligned so that its axis coincides with the Z axis. To accomplish this, twelve set screws 2002 have threaded engagement with a cylindrical projection 2004 on the calibration insert 1922 and extend into a hole 1924 in the calibration insert through which the length standard 1900 passes. The set screws 2002 lie in an X-Y plane, bear against the periphery of the length standard 1900 and permit adjustment of the length standard 1902 which is swept into the Z axis to an accuracy of ±50 nm by an indicator, mounted on an extension bracket on the spindle 3200, which rides around the cylindrical end of shaft 1904 projecting beyond projector 2004. A differential screw 1926 has threaded engagement with both the calibration insert 1922 and head piece 1600 and is used to move the calibration insert 1922 and length standard 1900 on the Z axis exactly as the tool bit 200 is moved by differential screw 1306. Constant contact pressure is maintained between calibration insert 1922 and its recess in head piece 1302 by means of a gib 2006 and screws 1502, shown in FIG. 20.

In use, the LVDT 1708 has its null reading established by wringing a gage block against a lapped open end 1930 of the shaft 1904 through which the probe 1732 extends to touch eccentric reference ball 400. The length standard 1900 is then inserted into the calibration insert 1922 which has previously been installed in head piece 1600. The end of the length standard 1900 near the eccentric reference ball 400 is supported by the half sleeve 1730 attached to shaft 1904 by a rubber band (not shown). The half sleeve 1730 rests on the eccentric reference ball 400 and hence aligns this end of standard 1900 with the Z-axis. A supply of oil is gravity fed into tool bar 500 and around the shaft 1904 through funnel 185 and hole 503 in the end of the tool bar nearer the eccentric reference ball 400. The oil thermally stabilizes the length standard 1900 and tool bar 500; it also provides a buoyant force which supports the length standard 1900, thus eliminating sag as a source of measurement error. The wall of shaft 1904 is made sufficiently thin so that the buoyant force is approximately equal to the weight of standard 1900. Oil drains out of tool bar 500 through drain hole 1615 in head piece 1600. The length standard 1900 is aligned coaxially with the Z axis by set screws 2002 and moved back and forth on the Z axis to bring the standard 1900 within the range of LVDT 1708 similarly to the calibrating device 1700; the required accuracy, 0.0127 cm, is the same. The probe 1732 is placed in conact with the surface of the eccentric reference ball 400 by air through cable 1710. Once this has been accomplished, the differential screw 1926 moves the standard 1900 on the Z axis until the center of a spherical end 1928 of shaft 1904 represents the one meter position at which the tool bit 200 is to be located. While the length standard 1900 is still in position, this point is transferred to the calibration fixture 2600 and mastering station 2900 described below. The accuracy of location of this position is ±50 nm along the Z-axis.

To establish the reference positions for the tool bit 200 in the Y and X directions, the tool bar length standard 1900 and the bar length calibration insert 1922 are removed from head piece 1600. A tool height and offset calibration insert 2300, shown in FIGS. 23, 24 and 25, is installed in head piece 1600. Calibration insert 2300 is of the same general shape as calibration insert 1922 and tool holder 1402 except for a reference projection 2304. The reference projection 2304 has a parallelepipedal base 2306 extending from a front face 2303 of the insert 2300 along the Z axis. A locating cylinder 2308 extends from base 2306 further along the Z axis and is swept into alignment with the Z axis by an indicator mounted on the main air bearing spindle 3200. The locating cylinder 2308 terminates in a stepped partially spherical surface 2310. A step 2402 lies on the Z axis in an X-Z plane and serves as a height reference surface. A spherical portion 2312 of the surface 2310 lies below the Z axis with its radius coincidental with the Z axis. The spherical portion 2312 may serve as a Z axis reference surface. One side of the base 2306 is an offset reference surface 2502 oriented in the Y-Z plane.

The tool height and offset calibration insert 2300 is used in conjunction with a tool calibration fixture 2600, shown in FIGS. 26, 27 and 28. The tool calibration fixture 2600 is composed mainly of a yokelike structure which is hung on tool head 1300. Its purpose is to position three LVDT's, one in each direction, to measure the tool reference position from the height and offset calibration insert 2300 and tool bar length standard 1900 and to transfer these positions to the tool bit via a mastering station 2900 so that the tool bar length standard 1900 and calibration inserts 1902 and 2300 need not be used for each tool bit change once initial calibration is completed. Tool calibration fixture 2600 has a triangular head 2702 in wich Z axis, Y direction, and X direction LVDT's 2704, 2604 and 2706 are respectively mounted. Each LVDT extends into a cavity 2708 visible from the side through a port 2709 in the triangular head 2702. Each LVDT is held in position by a screw-type pinch clamp; the Z axis LVDT pinch clamp 2802 is representative of all three. Two yoke arms 2710 integral with the triangular head 2702 extend along each side of the tool head 1300 and tool bar 500. A support rod 2712 is fixed to both yoke arms 2710 and is oriented with its long axis in the X direction. When the tool calibration fixture 2600 is in position, the support rod is engaged by spring plungers 2714 mounted in L-shaped clips 2716 fixed to the top of tool bar 500 and cavity 2708 is thus placed around the tool bit 200. The spring plungers 2714 provide a repeatable contact pressure against the support rod 2712. The remaining support for the fixture 2600 and location along the Z direction is provided by flats 2608 on each yoke arm 2710; the flats 2608 rest against the Y direction guide rails 1412 on the end of tool bar 500. A bias plate 2718 fixed to one yoke arm 2710 contains a set screw 2720 wich locates the tool calibration fixture 2600 in the X direction and provides repeatable accuracy from one use of the fixture to the next.

The mastering station 2900 preserves measurements made by the tool calibration fixture 2600. The mastering station 2900, shown in FIGS. 29, 30, and 31, is mounted at any convenient location on the machine base 110. The mastering station 2900 records the reference positions obtained by use of the tool bar length standard 1900 used in conjunction with the tool height and offset calibration insert 2300 and the tool calibration fixture 2600. The mastering station 2900 consists essentially of an anvil 2904 which is adjustable by means of shims along three orthogonal axes. An adaptor plate 2906 serves to mount the mastering station 2902 and provides mating flats 3001 for the flats 2608 on yoke arms 2710. Attached to the adaptor plate 2906 by cap screws 2008 is holder 2910; holder 2910 is generally parallelepipedal in shape and its functions are to provide support for anvil 2904 and tool calibration fixture 2600 and to permit adjustment of anvil 2904 in the X and Y directions. Projecting from the upper surface of holder 2910 are two ears 3002 containing spring plungers 3004; ears 3002 and plungers 3004 engage support rod 2712 of the tool calibration fixture 2600 in the same way as do clips 2716 and spring plungers 2714. Projecting from the lower edge of holder 2910 is Y-axis adjustment support 2912. A cap screw 2914 passes through an oblong slot 3102 in the Y-axis adjustment support 2912, a Y-axis shim plate 3104 and has threaded engagement with an anvil holder 3106. Also projecting from the front surface of the holder 2910 in an X-axis adjustment support 3108; as in the case of the Y-axis, cap screw 3012 passes through oblong slot 3104 in the X-axis adjustment support 3108, an X-axis shim plate 3114 and has threaded engagement with the anvil holder 3106. In this fashion, the anvil holder 3106 is retained snugly against X and Y-axis shim plates 3114 and 3104 while still being movable in X and Z directions.

To adjust the anvil 2904 in the remaining axis, the anvil itself is moved with respect to the anvil holder 3106. Anvil holder 3106 is a O-shaped piece containing a guide channel 3110 for anvil 2904. As shown in FIG. 31, guide channel 3110 supports the parallelpipedal anvil 2904 on three of its four sides. After adjustment of the anvil holder 3106 in the X and Y directions, cap screw 3118, passing through oblong hole 3120 and having threaded engagement with holder 2910, is tightened to prevent further movement of the anvil holder 3106.

A base portion 2916 of anvil 2904 slides in the guide channel 3110 and contains an oblong slot 2918 through which passes a cap screw 3122 which has threaded engagement with anvil holder 3106. A tab 2920 extending pendently from base 2916 contains a hole 2922 through which cap screw 2924 passes; the cap screw also passes through a shim 2926 and has threaded engagement with anvil holder 3106. The cap screw 2924 and shim 2926 permit adjustment of the anvil 2904 in the Z direction. Spring plungers 2928 minimize backlash between base 2916 and guide channel 3110; the plungers have threaded engagement with anvil holder 3106 and bear against the upper surface of base 2918.

The anvil accepts the readings of the tool calibration fixture X direction, Y direction, and Z axis LVDT's 2706, 2604, and 2704 respectively on X direction, Y direction, and Z axis reference surfaces 3006, 3008, and 2930 respectively. X direction reference surface 3006 is formed by a flat portion in a Y-Z plane near an end of anvil 2904 away from holder 2910. Y direction reference surface 3008 is formed by a flat portion in an X-Z plane which contains the Z axis at the same end of anvil 2904. Z axis reference surface 2930 is formed by the end of anvil 2904 away from holder 2910 and lying below the Z axis which forms a quarter of a sphere.

In use, the readings obtained by the tool calibration fixture 2600 from the tool bar length standard 1900 and tool height offset and calibration insert 2300 are transferred to the mastering station 2900. The position of the anvil 2904 in the X and Y directions and on the Z axis become the reference positions for tool calibration fixture LVDT's 2604, 2706, and 2704. Then, by using only the mastering station 2900 and tool calibration fixture 2600, the tool bit 200 can be quickly located in its reference positions to an accuracy of ±25 nm in X and Y directions and on the Z axis. Note that setup calibration is accomplished by adjustments only at the tool head end of tool bar 500. Also, all LVDT's are at this end, and no risk of losing tool bar 500 to Z axis alignment exists.

Figure 33:
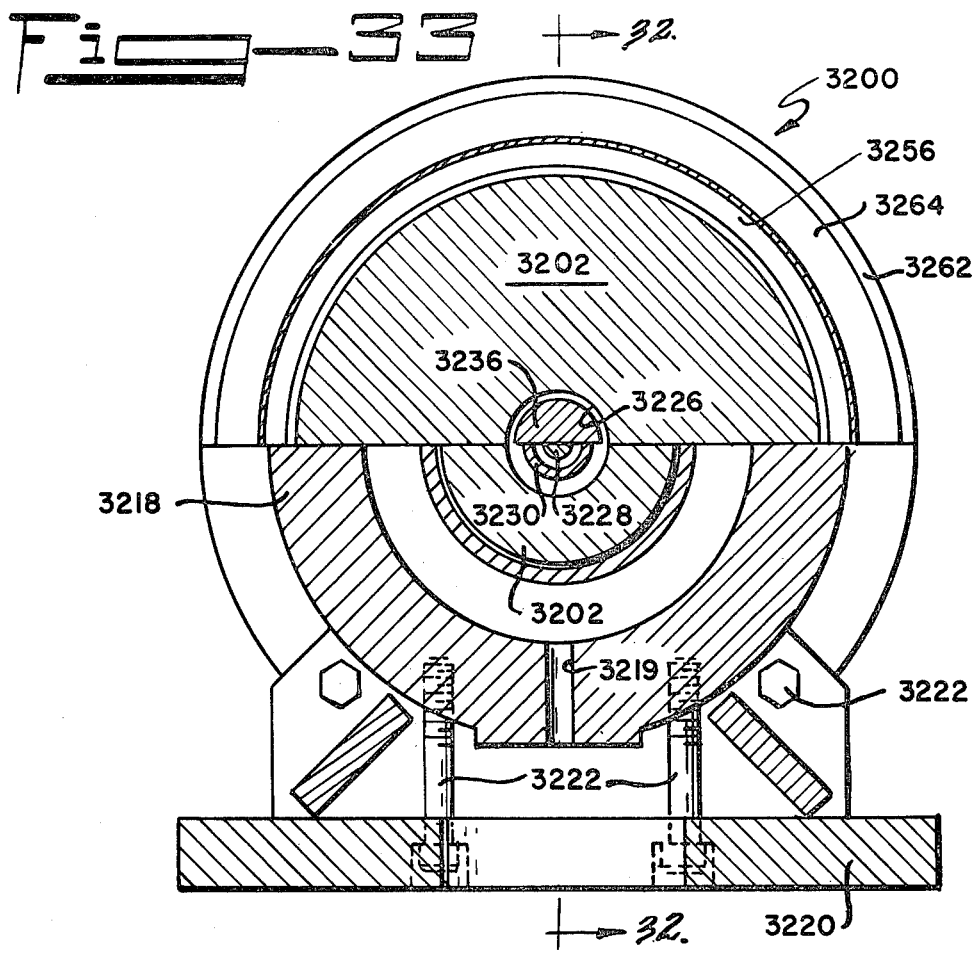
FIG. 33 is a sectional view in an X-Y plane of the main air bearing spindle along line 33—33 of FIG. 32.
Figure 34:
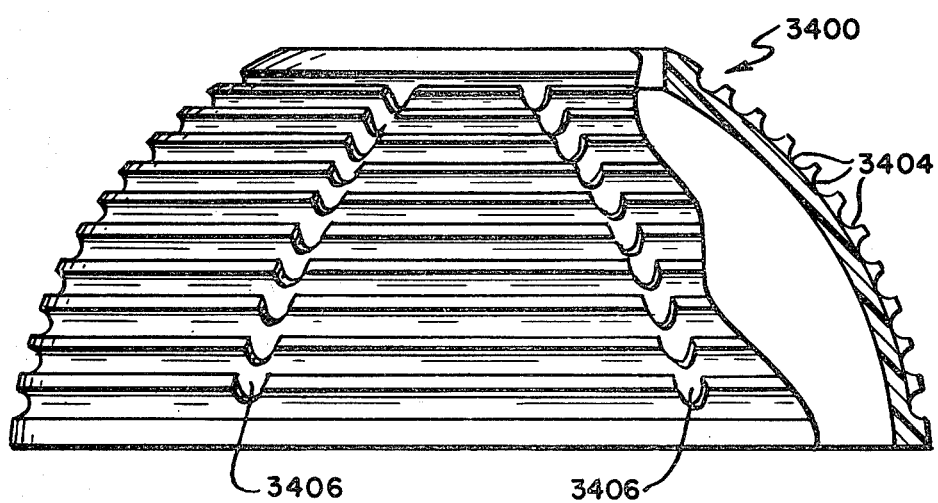
FIG. 34 is a detail view, partially broken away, of a spherical journal bearing from the main air bearing spindle.

The main air bearing spindle 3200 is known in detail in FIGS. 32 through 34. Its purpose is to rotate the workpiece 174 relative to the tool bit 200; it maintains a rotational accuracy of 25 nm TIR. Referring to FIG. 32, the main air bearing spindle 3200 is comprised of a spindle 3202 rotatably supported within a spindle housing 3204. Spindle 3202 is coaxial with the Z-axis. Radial forces (in the X-Y plane) and thrust forces (along the Z-axis) are accommodated by front and rear spherical air-pressurized graphite journal bearings 3206 and 3208. Both bearings are affixed to bearing bases 3210 and 3212 attached to spindle 3202, graphite bearings 3400 and front and rear bearing housings 3214 and 3216 which form portions of spindle housing 3204. Housings 3214 and 3216 are separated by and fixed to housing center 3218; the complete assembly is then fixed to base 3220 by cap screws 3222, thus forming spindle housing 3204. Hole 3219 in center 3218 provides an exhaust for lubricant air escaping from the bearings 3206 and 3208. Base 3220 is in turn rigidly attached to raised portion 170 of machine base 110; see FIG. 1.

Spindle 3202 has a hollow center 3226 which extends the entire length of the spindle. The hollow center 3226 contains a shaft 3228 which supports a tube 3230 concentric with shaft 3228 by spacers 3232. A supply of oil coolant is delivered through funnel 184, shown in FIG. 1, through the annulus between tube 3220 and shaft 3228 and spills into hollow center 3226 through holes 3234 in spacer 3232. The oil coolant shortens the time required to thermally stabilize the main air bearing spindle 3200 from a few hours to a few minutes. Shaft 3228 is stationary and is therefore supported from the front end of spindle 3202 by rotating joint 3236 rotatably mounted in gland 3238 which is in turn fixed to spindle 3202. Undesirable heating is caused by shearing of lubricant air in the front journal bearing 3206; heating also occurs in the rear journal bearing 3208 but is of a sufficiently smaller magnitude that thermal excursions may be absorbed by a flexure flange 3240 anchored to bearing base 3212 and spindle 3202 through shaft key 3242.

Once within the hollow center 3226, oil flows by centrifugal force due to rotation of the spindle through passages 3244 which extend radially outward from hollow center 3226 and which communicate the hollow center with a V-shaped trough 3246 in front bearing base 3210. From trough 3246 the oil flow through twenty-four cooling passages 3248 to collection channel 3250. The oil flow through passages 3248 increases the heat removal rate from the front journal bearing 3206 sufficiently so that much less time is required to establish equality between heat addition and heat removal rates; the result is that thermal growth of the main air bearing spindle 3200 ceases within a few minutes of the time the spindle begins rotating the workpiece 174. From collection channel 3250 the oil flows into six outlet passages 3252 in spindle 3202; each outlet passage is terminated by a plastic orifice 3254 which controls the flow of oil. The orifices 3524 are thermally nonconductive so that heating caused by shearing of the oil as it exits the orifices is not easily transferred to spindle 3202. Centrifugal action flings the oil from spindle 3202 into circumferential tube 3256; the oil then returns by gravity to the cooler (not shown) through outlet 3258. Oil is kept from reaching the bearing by flingers 3260 screwed to bearing bases 3210 and 3212 and collector rings 3262 screwed to bearing retaining rings 3224. Circumferential tube 3256 is attached to tube support ring 3264 which is in turn screwed to collector ring 3262.

Air is supplied to graphite bearings 3402 by passages 3266 which place an air distributor trough 3268 in communication with the convex exterior surface of graphite bearings 3402. Passages 3266 are drilled in front and rear bearing housings 3214 and 3216. Air is supplied to distribution trough 3268 by passages 3270 to which air hoses may be connected.

As shown in FIG. 34, graphite bearings 3400 contain a series of grooves 3404 on the convex surfaces of the bearings; each groove 3404 lies in an X-Y plane and is interrupted by six ducts 3406; each air duct 3406 intersects grooves 3404 at a right angle and lies in a common plane with the Z axis and is connected to one passage 3266 so that air is distributed evenly to the grooves 3404. The air is supplied at sufficient pressure to pass through the porous graphite bearings 3400 and support the bearing bases 3210 and 3212 a distance away from their respective graphite bearings 3400.

At the rear end of main air bearing spindle 3200 a balancing wheel 3272 is retained on spindle 3202 by key 3242 and nut 3274 which has threaded engagement with a reduced diameter portion of spindle 3202.

After location of tool bit 200 by means of the tool calibration fixture 2602, the tool bit 200 has its contour gaged by a tool gage 3500, shown in FIGS. 35 and 36, and mounted on a gage arm 3502. The tool gage 3500 is essentially an electrical switch which requires extremely slight pressure to make or break the electrical circuit of the switch. As shown in FIG. 36, a metal gaging ball 3602 rests movably on a triangular glass platen 3604; also see FIG. 37. The glass platen 3604 has two electrical contact pins 3504 embedded in it near its apex, which is the part of the platen 3604 closest to the tool bit 200; the circuit of which these electrical contact pins 3504 are a part is complete when gaging ball 3602 contacts both electrical contacts 3504 which project upwardly from the surface of platen 3604. Pins 3504 are located so that when the tool gage 3500 is in position the point on the surface of ball 3602 which will contact cutting tool bit 200 is precisely known to an accuracy of ±25 nm in both X and Y directions. Glass platen 3604 is slightly inclined at an angle of 0.0667° to cause the ball 3602 to rest against pins 3504 with a force of about 0.1 gm, which is appropriate for the diamond-tipped tool bits 200 being used. The angle of glass platen 3604 is controlled by oval-headed set screws 3606 bearing against a bottom surface of platen 3604. Glass platen 3604 is retained against set screws 3606 by retaining bolt 3608 which is fixed to glass platen 3604 and which passes through an oblong hole in the top surface of a support 3508; nut 3610 has threaded engagement with retaining bolt 3608 and traps retaining spring 3612 compressively between nut 3610 and support 3508. Refer also to FIG. 38. The contact pressure between glass platen 3604 and set screws 3606 can thus be varied by tightening or loosening nut 3610.

In the Z direction, glass platen 3604 is retained by C-bracket 3614 which has a downwardly extending flange fastened to a side of the upper surface of support 3508 away from the tool bit 200. Bracket 3614 extends above the upper surface of support 3508 and has two arms 3616 which extend toward tool bit 200 and which envelop the base and a portion of the sides of the triangular glass platen 3604. Set screws 3520 and 3618 are mounted respectively in each arm 3616 and in the rear portion of C-bracket 3614 which extends above the upper surface of support 3508. Set screws 3520 and 3618 retain and position glass platen 3604 in the X and Z directions.

Support 3508 is fixed to one end of the gage arm 3502 which, as can be seen in FIGS. 35 and 1, is an L-shaped hollow arm used to move the tool gage 3500 into and out of the gaging position. Linear motion parallel to the Z axis and rotary motion in the X-Y plane is provided by a Rotolin ML 2000-2875-6 linear and rotary bearing 188. Linear motion is provided so that the tool bit 200 may be positioned as close as possible to the workpiece 174 before tool contour gaging takes place to avoid introducing errors caused by Z-axis slide 118. Gage arm 3502 and bearing 188 are supported by pedestals 189 which, in turn, are anchored to raised portion 170 of machine base 110.

Oil coolant is supplied to the linear and rotary bearing 188 and flows through gage arm 3502 through an outlet hole 3512 in support 3508; the cooling oil insures that gage arm 3502 is at a uniform temperature throughout its length. Normal room temperature variations would disturb the accuracy of the gage arm 3502 and thus the tool gage 3500.

When in the gaging position, tool gage 3500 is supported by leg 3514 which is rotatably mounted to the bottom of support 3508 through pivot block 3620 and bearing 3622. Pivot block 3620 is attached to support 3508 by cap screws 3624 through shim 3626 which permits adjustment of the position of the tool gage 3500 in the Y direction. In the gaging position, the lower end of leg 3514 terminates in a V-shaped fitting 3516 which rests on a reference bar 3518 parallel to the Z-axis and permanently attached to machine base 110 (see also FIG. 1); this insures that the center of gaging ball 3602 is aligned with the Z-axis, i.e., in the X and Y directions. The location of gaging ball 3602 in the Z direction is not important since the tool contour gaging is in the nature of a differential measurement from a known tool position to an accuracy of ±25 nm. Tool bit 200 is moved by a combination of X and omega axis motions to contact gaging ball 3602 at intervals of 1° throughout that portion of the nose contour of tool bit 200 to be used during a contouring cut; the portion of the nose to be used is determined by conventional mathematical methods. The position at which contact occurs is supplied to the dedicated computer.

FIGS. 37 and 38 display a workpiece gage 3700 very similar in construction and function to the tool gage 3500. The workpiece 3700 employs a gaging ball 3602 movably supported by an identical glass platen 3604. The ball 3602 and platen 3604 function in exactly the same way as they do in the tool gage 3500 except that in this case the electrical circuit formed by the contacts 3504 and the ball 3602 will be broken as the ball is brought gently against the surface of the workpiece 174. Platen 3604 is mounted on an angle bracket 3704. The glass platen 3604 is adjusted and retained by means identical to that used for the tool gage 3500. The assembly of ball 3602, platen 3604 and angle bracket 3704 is attached to a yoke 3706 which is similar to yoke 2604 in the tool calibration fixture 2600. Yoke 3706 has two arms 3708 which extend toward the eccentric reference ball 400 on both sides of tool head 1300. The arms are connected by a support rod 3710 which engages spring plungers 2714 on clips 2716 fastened to the top of tool bar 500. Flats 3806 on the ends of the yoke arms facing tool bar 500 rest against mating flats on the end of tool bar 500 when the yoke 3706 is in position. Bias plate 3712 performs the same function as does bias plate 2718. The light pressure exerted by the workpiece gage 3700, less than 1.5 Pa, prevents damage to the workpiece surface. Furthermore, because the workpiece gage 3700 is mounted on the tool bar 500, the position of gaging ball 3602 can be readily established. Gaging the workpiece 174 before it is removed from spindle 3200 insures that the workpiece will not be deformed by gravitational forces. This, in turn, simplifies the determination of the source of machining errors.

The embodiments of the invention in which an exclusive property or privilege is claimed are defined as follows:

1. A tool calibration system for use in combination with a micromachining tool, the micromachining tool comprising a tool head mounted in one end of a tool bar, and having a X axis, a Y axis, and a Z axis; the tool calibration system comprising a tool calibration fixture which comprises:
   a yokelike structure having a triangular head, a cavity in the triangular head, a port communicating a side of the triangular head with the cavity, yoke arms integral with the triangular head and extending along each side of the tool head and the tool bar, a support rod fixed to the yoke arms and engaged by a plurality of spring plungers mounted in a plurality of clips fixed to a top surface of the tool bar to place the cavity around a tool bit which may be mounted to an end of the tool head;
   a Z axis linear variable differential transformer adjustably mounted in the triangular head along the Z axis, the Z axis extending along an axis of the tool bar;
   a Y direction linear variable differential transformer adjustably mounted in the triangular head along the Y axis, the Y axis being perpendicular to the Z axis,
   a X direction linear variable differential transformer adjustably mounted in the triangular head along the X axis, the X axis being perpendicular to the Y axis and the Z axis;
   means for positioning the yokelike structure along the X axis and the Z axis; and
   means for retaining the positions of the X axis linear variable differential transformer, the Y axis linear variable differential transformer, and the Z axis linear variable differential transformer.

2. The tool calibration fixture system of claim 1 wherein a distal end of the tool head has an opening within which a tool holder is adjustably mounted, and which further comprises a tool height and offset calibration insert which is used for setting the X axis linear variable differential transformer and the Y axis linear variable differential transformer to a tool reference position, the calibration insert comprising:
   a main base which adjustably mounts in the opening in the tool head identical with the tool holder; and
   a reference projection having a parallelpipedal base extending from a front face of the main base and a locating cylinder extending from the parallelpipedal base for sweeping the calibration insert into alignment with the Z axis, the locating cylinder terminates in a step which serves as a height reference surface for setting the Y axis linear variable differential transformer to the tool reference position, and the parallelpipedal base has an offset surface on one side for setting the X axis linear variable differential transformer to the tool reference position.

* * * * *